(12) United States Patent  
Hashimura et al.

(10) Patent No.: US 12,285,795 B2  
(45) Date of Patent: Apr. 29, 2025

(54) METHOD FOR JOINING MEMBERS AND JOINED BODY

(71) Applicant: Kobe Steel, Ltd., Kobe (JP)

(72) Inventors: Toru Hashimura, Kobe (JP); Artur Rekets, Kobe (JP); Yasuhiro Maeda, Kobe (JP); Taiki Yamakawa, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 71 days.

(21) Appl. No.: 18/246,904

(22) PCT Filed: Sep. 29, 2021

(86) PCT No.: PCT/JP2021/035914  
§ 371 (c)(1),  
(2) Date: Mar. 28, 2023

(87) PCT Pub. No.: WO2022/091679  
PCT Pub. Date: May 5, 2022

(65) Prior Publication Data  
US 2023/0405661 A1    Dec. 21, 2023

(30) Foreign Application Priority Data  
Nov. 2, 2020   (JP) ................................. 2020-183666

(51) Int. Cl.  
*B60R 19/04*   (2006.01)  
*B21D 39/06*   (2006.01)  
(Continued)

(52) U.S. Cl.  
CPC ........... *B21D 39/06* (2013.01); *B21D 39/203* (2013.01); *B21D 53/88* (2013.01); *B60R 19/04* (2013.01)

(58) Field of Classification Search  
None  
See application file for complete search history.

(56) References Cited

U.S. PATENT DOCUMENTS 7,896,408 B2 * 3/2011 Hashimoto ............. B60R 19/24  
293/120  
10,974,673 B2 * 4/2021 Hashimura ............. B60R 19/34  
(Continued)

FOREIGN PATENT DOCUMENTS

JP    2018-153860 A    10/2018

OTHER PUBLICATIONS

International Search Report & Written Opinion Issued Nov. 2, 2021, in PCT/JP2021/035914, filed on Sep. 29, 2021, therein, 10 pages.

*Primary Examiner* — Joseph D. Pape  
(74) *Attorney, Agent, or Firm* — Oblon, McClelland, Maier & Neustadt, L.L.P.

(57) ABSTRACT

A bumper system includes a rear wall of a bumper beam provided with hole portions, and a bumper stay including tubular portions extending in the longitudinal direction, the tubular portions being inserted into the hole portions and joined to the hole portions by pipe expansion joining. The bumper stay includes a pulling-out obstructing portion protruding from the outer surfaces of the tubular portions in a cross section perpendicular to the longitudinal direction. The pulling-out obstructing portion abuts on the rear wall of the bumper beam in the direction in which the bumper stay is pulled out from the hole portions.

12 Claims, 28 Drawing Sheets

(51) Int. Cl.
  *B21D 39/20*   (2006.01)
  *B21D 53/88*   (2006.01)

(56) References Cited

U.S. PATENT DOCUMENTS

| | | | |
|---|---|---|---|
| 11,472,359 B2* | 10/2022 | Yamakawa | F16F 7/00 |
| 2010/0038874 A1* | 2/2010 | Varela | B60B 35/08 |
| | | | 301/124.1 |
| 2018/0015527 A1* | 1/2018 | Maeda | B21D 39/20 |
| 2019/0375355 A1 | 12/2019 | Maeda et al. | |

* cited by examiner

METHOD FOR JOINING MEMBERS AND JOINED BODY

CROSS-REFERENCE TO RELATED APPLICATIONS

This is a national phase application in the United States of International Patent Application No. PCT/JP2021/035914 with an international filing date of Sep. 29, 2021, which claims priority of Japanese Patent Application No. 2020-183666 filed on Nov. 2, 2020, the contents of which are incorporated herein by reference.

TECHNICAL FIELD

The present invention relates to a method for joining members and a joined body.

BACKGROUND ART

In the automobile field, in order to reduce weight and improve safety, multi-materialization has been performed in which a lightweight aluminum alloy component and a high-strength steel component are used in combination. A problem with multi-materialization is the joining of dissimilar metal components. To join dissimilar metal components, it is difficult to adopt welding usually often used, and an alternative joining method is required.

Rubber bulge joining is known as a method for enabling joining of dissimilar metal components in multi-materialization. The rubber bulge joining is a method in which a tube body is inserted into a hole portion of a wall surface body, and the tube body is expanded and deformed using an elastic body to press the tube body against the hole portion of the wall surface body.

For example, JP 2018-153860 A discloses a method for joining members by rubber bulge joining and a joined body. In JP 2018-153860 A, a tube body (bumper stay) is configured as a double pipe in which two pipe portions are connected by a connection wall at side surfaces. Therefore, when a force is applied in a direction in which the tube body (bumper stay) is pushed into the hole portion of the wall surface body (bumper beam), the connection wall abuts on the wall surface body. Therefore, the penetration of the tube body is suppressed, and the joining between the tube body and the wall surface body is prevented from being released.

SUMMARY OF THE INVENTION

In the method for joining members and the joined body of, the joining strength is high against the force in the direction in which the tubular body is pushed into the hole portion, but sufficient consideration has not been made on the force in the direction in which the tubular body is pulled out from the hole portion, and there is room for improvement.

An object of the present invention is to provide a method for joining members and a joined body having high joining strength against a force in a direction in which a tube body is pulled out from a hole portion.

A first aspect of the present invention provides a joined body including: a wall surface body provided with a hole portion; and a tube body including a tubular portion extending in a longitudinal direction, the tubular portion being inserted into the hole portion and joined to the hole portion by pipe expansion joining. The tube body includes a pulling-out obstructing portion protruding from an outer surface of the tubular portion in a cross section perpendicular to the longitudinal direction. The pulling-out obstructing portion abuts on the wall surface body in a direction in which the tube body is pulled out from the hole portion.

According to this configuration, even when a force is applied in a direction in which the tube body is pulled out from the hole portion, the pulling-out obstructing portion is caught by the wall surface body, so that the tube body can be prevented from being pulled out from the hole portion. Therefore, high joining strength and reliability can be secured as a joined body.

The hole portion may have a shape into which the tubular portion in a pipe non-expanded state and the pulling-out obstructing portion are configured to be inserted.

According to this configuration, the joined body can be easily manufactured. Specifically, from the viewpoint of ease of manufacturing, it is preferable that the pulling-out obstructing portion is not caught by the wall surface body when the tube body is pushed into the hole portion, and is caught by the wall surface body when the tube body is pulled out from the hole portion. In the above configuration, since the tubular portion and the pulling-out obstructing portion can be inserted into the hole portion in the pipe non-expanded state of the tube body, the former can be specifically achieved. Accordingly, since the pulling-out obstructing portion can be formed in the tube body in advance, a machining step such as forming the pulling-out obstructing portion after inserting the tubular portion into the hole can be omitted. In addition, in the latter case, the attitude of the tube body may be changed so that the pulling-out obstructing portion is caught by the wall surface body after the tube body is inserted into the hole portion, the tube body may be bulged so that the pulling-out obstructing portion is caught by the wall surface body along with pipe expansion joining of the tube body, or the hole portion may be partially closed so that the pulling-out obstructing portion is caught by the wall surface body after the tube body is inserted into the hole portion.

The wall surface body may include a collar member disposed to fill a gap between a hole edge of the hole portion and the outer surface of the tubular portion.

According to this configuration, the gap between the tubular portion and the hole portion can be filled with the collar member, the degree of adhesion between the tubular portion and the hole portion can be increased, and the joining strength of the joined body can be increased.

The wall surface body may include a lock member disposed to partially close the hole portion, the lock member configured to abut on the pulling-out obstructing portion in a direction in which the tube body is pulled out from the hole portion.

According to this configuration, the lock member can easily configure the catching structure of the pulling-out obstructing portion.

The tube body may include a pushing-in obstructing portion protruding from the outer surface of the tubular portion in a cross section perpendicular to the longitudinal direction. The pushing-in obstructing portion may abut on the wall surface body in a direction in which the tube body is pushed into the hole portion. The tube body may include two of the tubular portions. The pushing-in obstructing portion may connect the two tubular portions.

According to this configuration, even when a force is applied in a direction in which the tube body is pushed into the hole portion, the pushing-in obstructing portion is caught by the wall surface body, so that the penetration of the tube body can be suppressed. Therefore, higher joining strength and reliability can be secured as a joined body.

A material of the wall surface body may be different from a material of the tube body.

According to this configuration, multi-materialization can be achieved. In particular, in multi-materialization, joining of dissimilar materials is a problem, but the joined body having high joining strength can be provided by the above configuration.

A second aspect of the present invention provides a method for joining members, the method including: preparing a wall surface body including a hole portion and a tube body including a tubular portion extending in a longitudinal direction and a pulling-out obstructing portion protruding from an outer surface of the tubular portion in a cross section perpendicular to the longitudinal direction; inserting the tubular portion of the tube body and the pulling-out obstructing portion into the hole portion; and causing the pulling-out obstructing portion to abut on the wall surface body in a direction in which the tube body is pulled out from the hole portion, and joining the tube body to the hole portion by pipe expansion joining. In addition, the pipe expansion joining may be rubber bulge joining.

In the joined body manufactured by this method, even when a force is applied in a direction in which the tube body is pulled out from the hole portion, the pulling-out obstructing portion is caught by the wall surface body, so that the tube body can be prevented from being pulled out from the hole portion. Therefore, high joining strength and reliability can be secured as a joined body. In particular, in the above method, rubber bulge joining may be adopted. In the rubber bulge joining, since there are few restrictions on the material and shape of the member to be pipe-expanded and uniform pipe expansion is possible, high joining strength can be easily secured.

According to the present invention, in the method for joining members and the joined body, it is possible to prevent the tube body from being pulled out from the hole portion of the wall surface body.

MODE FOR CARRYING OUT THE INVENTION

Hereinafter, embodiments of the present invention will be described with reference to the accompanying drawings.

First Embodiment

Figure 1:
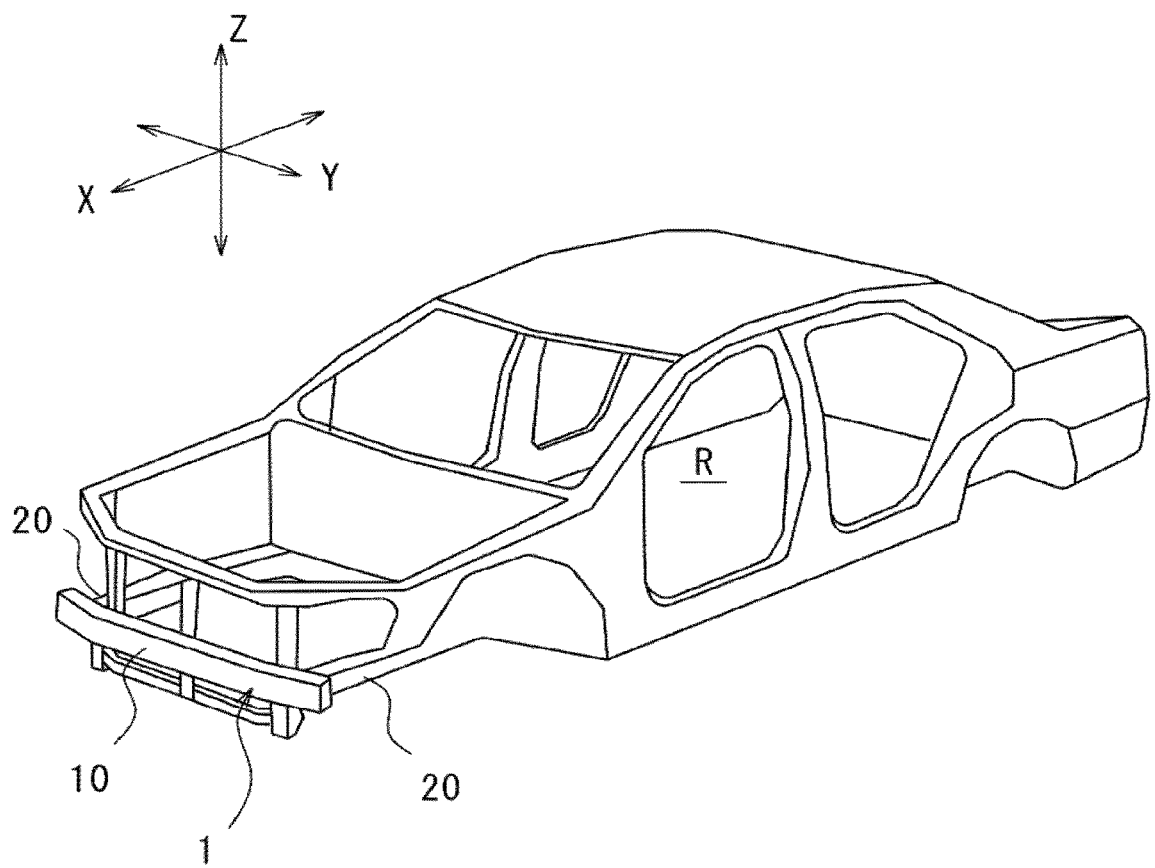
FIG. 1 is a perspective view of an automobile framework.
Figure 2:
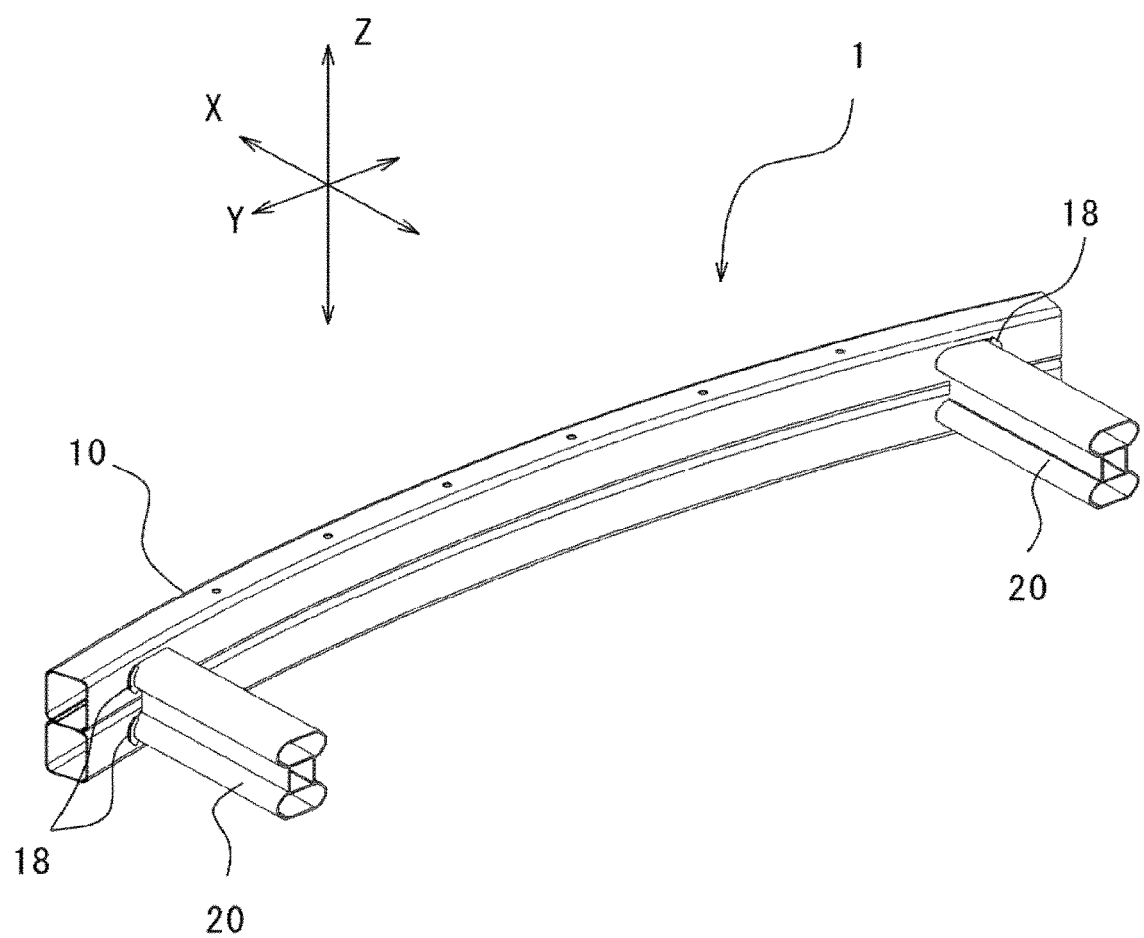
FIG. 2 is a perspective view before rubber bulge joining of a bumper system according to a first embodiment.

A bumper system 1 as an example of a joined body of the present invention will be described with reference to FIGS. 1 and 2. In FIGS. 1 and 2, the X direction indicates a vehicle front-rear direction, the Y direction indicates a vehicle width direction, and the Z direction indicates a vehicle vertical direction. The same applies to the subsequent drawings.

The bumper system 1 is disposed at the front portion of the automobile framework and serves to protect the vehicle interior R from a front impact. The bumper system 1 includes a bumper beam (an example of a wall surface body) 10 extending in the vehicle width direction and a bumper stay (an example of a tube body) 20 extending in the vehicle front-rear direction. The bumper stay 20 is joined to both end portions of the bumper beam 10 in the vehicle width direction.

Figure 3:
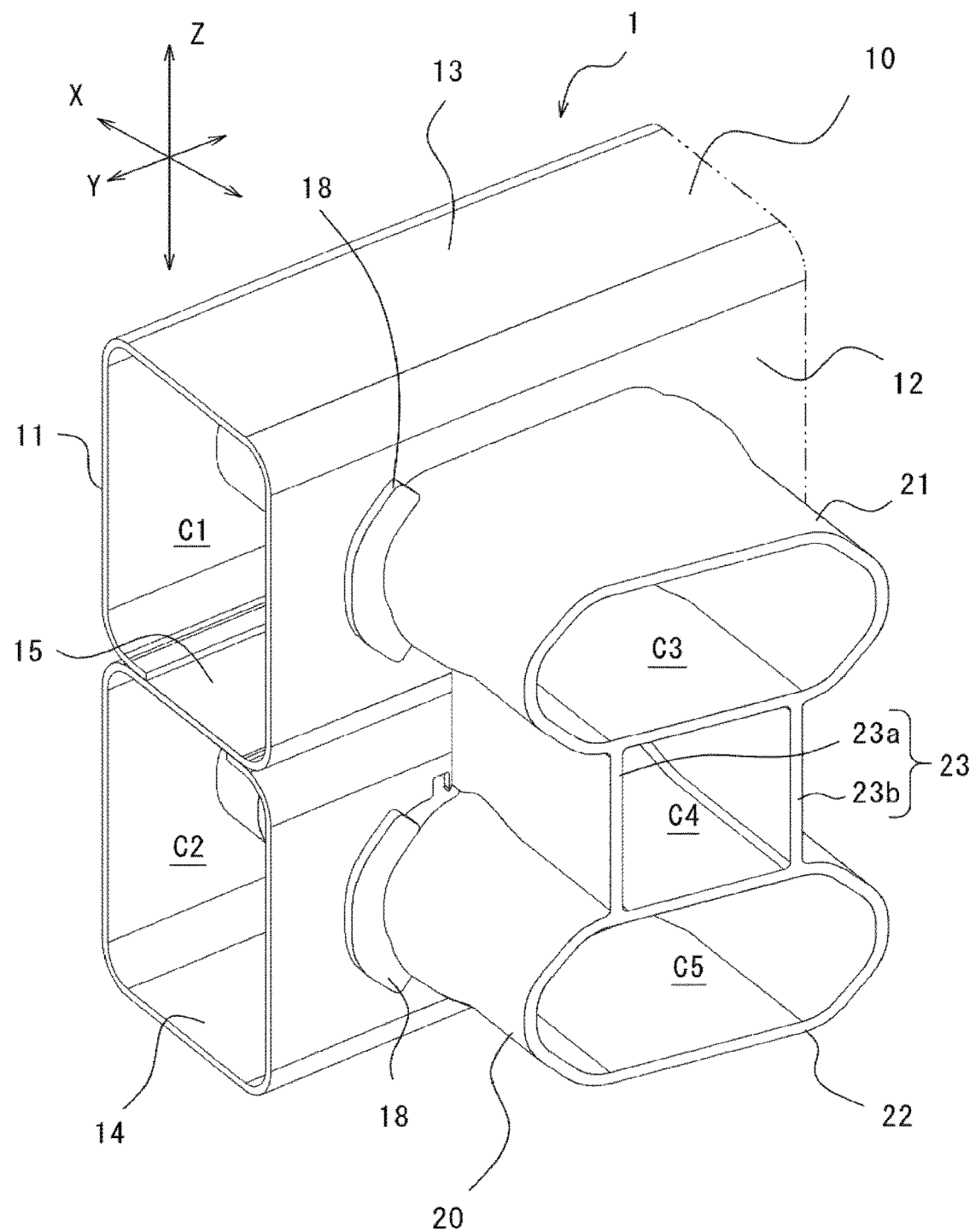
FIG. 3 is an enlarged perspective view of a joint portion after rubber bulge joining of the bumper system in FIG. 2.

Although details will be described later with reference to FIG. 3, the bumper stay 20 is joined to the bumper beam 10 by pipe expansion. In the bumper system 1 of the present embodiment, a structure for preventing pipe expansion joining from being released is adopted. In particular, this structure effectively prevents the bumper stay 20 from being pulled out from the bumper beam 10 toward the vehicle rear side of the vehicle to be released in joining. Hereinafter, the structure will be described.

Figure 4:
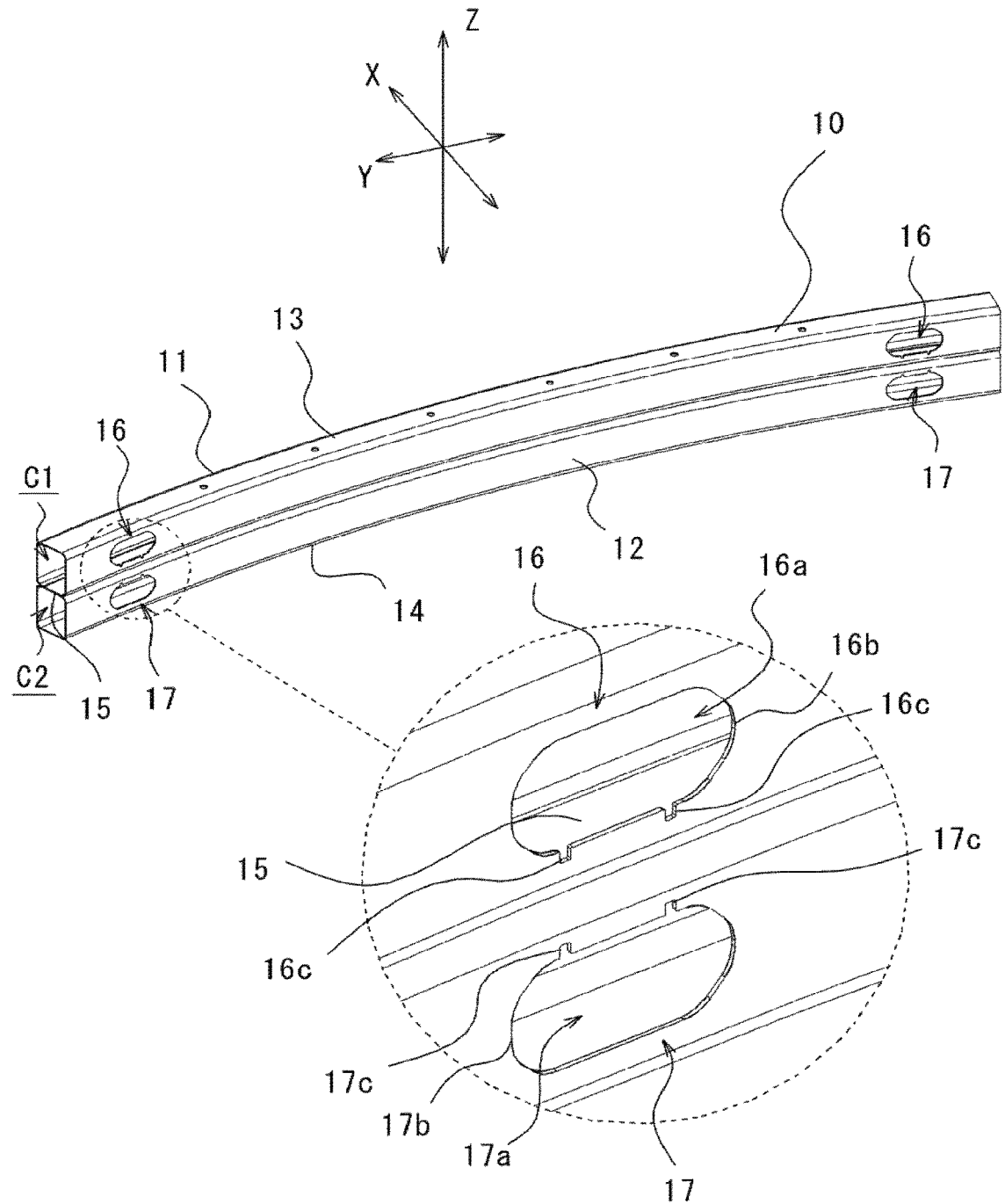
FIG. 4 is a perspective view of a bumper beam of the bumper system in FIG. 2.

Referring to FIG. 4, the bumper beam 10 is formed by bending a steel plate. The bumper beam 10 extends roughly in the vehicle width direction. The bumper beam 10 is curved in an arcuate shape as viewed from the vehicle vertical direction. The shape of the cross section perpendicular to the vehicle width direction of the bumper beam 10 is a figure-of-eight shape, and the two closed section portions C1 and C2 are connected in the vehicle vertical direction.

Specifically, the bumper beam 10 has a front wall 11 and a rear wall 12 disposed to face each other in the vehicle front-rear direction, and an upper wall 13 and a lower wall 14 arranged to face each other in the vehicle vertical direction. The upper wall 13 connects upper ends of the front wall 11 and the rear wall 12 in the vehicle vertical direction, and the lower wall 14 connects lower ends of the front wall 11 and the rear wall 12 in the vehicle vertical direction. In addition, the bumper beam 10 has a partition wall 15 disposed to face the upper wall 13 and the lower wall 14, between the upper wall 13 and the lower wall 14 in the vehicle vertical direction.

The rear wall 12 is provided with two hole portions 16 and 17 through which the bumper stay 20 can be inserted at respective end portions in the vehicle width direction. In the vehicle vertical direction, the partition wall 15 is disposed so as to be positioned between the two hole portions 16 and 17. The partition wall 15 partitions the two closed section portions C1 and C2 and is shared by the two closed section portions C1 and C2.

The hole portions 16 and 17 include through-holes 16a and 17a penetrating the rear wall 16 in the vehicle front-rear direction, and hole edges 16b and 17b defining the through-holes 16a and 17a and having a corner-rounded rectangular shape (track shape) when viewed from the vehicle front-rear direction, respectively. The hole edges 16b and 17b are respectively provided with guide grooves 16c and 17c having shapes complementary to the pulling-out obstructing portion 24 to be described below. The guide grooves 16c and 17c are formed by partially cutting-out the hole edges 16b and 17b downward or upward, respectively.

Figure 5:
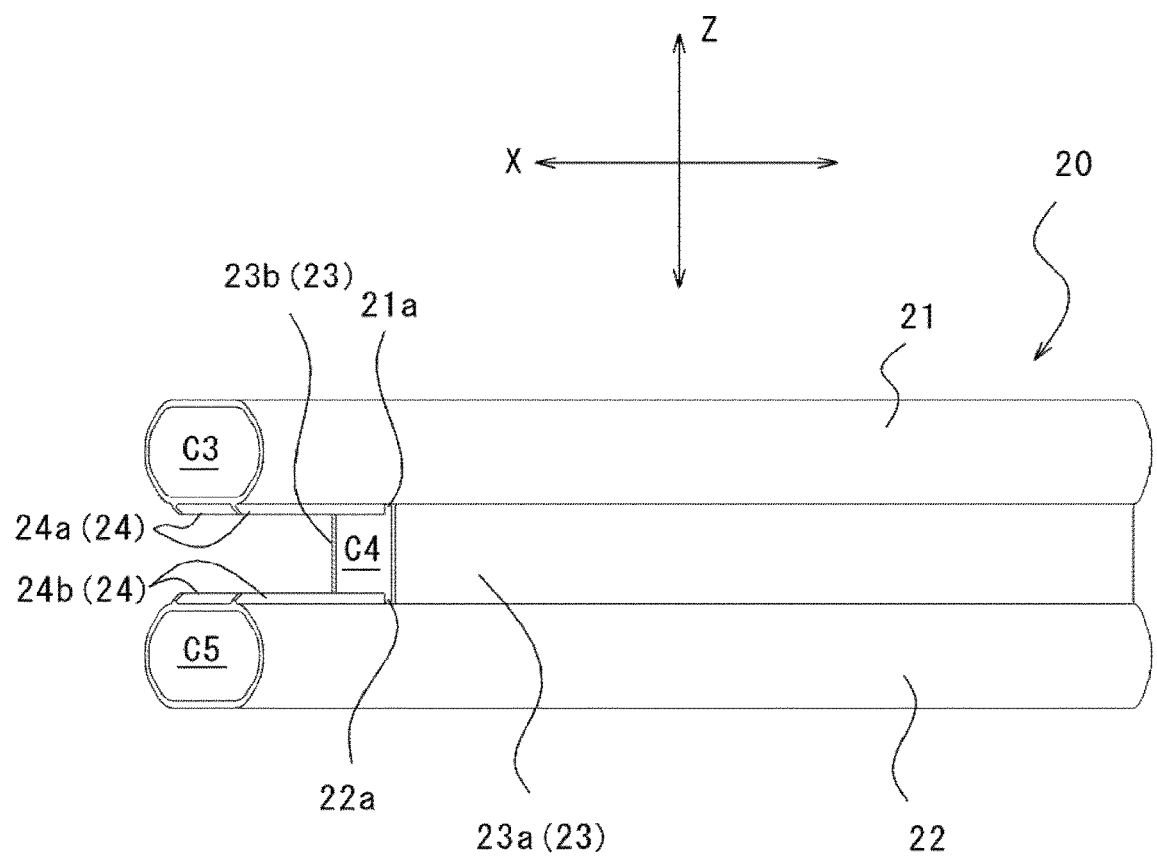
FIG. 5 is a perspective view of a bumper stay of the bumper system in FIG. 2.

Referring to FIG. 5, the bumper stay 20 is made of an extruded material made of an aluminum alloy. The bumper stay 20 extends in the vehicle front-rear direction (longitudinal direction), and has the front end portion cut in accordance with the curved shape of the bumper beam 10.

The bumper stay 20 includes two tubular portions 21 and 22 extending in the vehicle front-rear direction (longitudinal direction) and separately disposed in the vehicle vertical direction, a pushing-in obstructing portion 23 connecting the two tubular portions, and a pulling-out obstructing portion 24 protruding from outer surfaces of the two tubular portions 21 and 22.

The two tubular portions 21 and 22 have the same corner-rounded rectangular shape (track shape) in a cross section perpendicular to the longitudinal direction. The outer shape of each of the two tubular portions 21 and 22 is similar to the inner shape of each of the two hole portions 16 and 17. In addition, the outer shape of each of the two tubular portions 21 and 22 is slightly smaller than the inner shape of each of the two hole portions 16 and 17, and the two tubular portions 21 and 22 are configured to be insertable into the two hole portions 16 and 17.

The pushing-in obstructing portion 23 includes two connection walls 23a and 23b facing each other in the vehicle width direction. Each of the two connection walls 23a and 23b has an upper end connected to the lower surface of the upper tubular portion 21 and a lower end connected to the upper surface of the lower tubular portion 22 in the vehicle vertical direction. Therefore, the bumper stay 20 has three closed cross section portions C3 to C5 connected in the vehicle vertical direction in a cross section perpendicular to the vehicle front-rear direction.

Each of the two connection walls 23a and 23b is disposed in a region of about three-quarters in the rear of the two tubular portions 21 and 22, and the front end portion is cut in the vehicle front-rear direction in accordance with the curved shape of the bumper beam 10. The pulling-out obstructing portion 24 is disposed in the remaining region of about one quarter in the front.

The pulling-out obstructing portion 24 includes a protruding portion 24a protruding downward from the outer surface (specifically, the lower surface) of the upper tubular portion 21 and a protruding portion 24b protruding upward from the outer surface (specifically, the upper surface) of the lower tubular portion 22. Each of the protruding portions 24a and 24b has a pair of protruding ridge shapes extending in the vehicle front-rear direction and facing each other in the vehicle width direction.

Referring to FIGS. 4 and 5, the size of the protruding portion 24a protruding downward is smaller than the size of the guide groove 16c cut-out downward, and the protruding portion 24a can pass through the guide groove 16c when the tubular portion 21 is inserted into the hole portion 16. Similarly, the size of the protruding portion 24b protruding upward is smaller than the size of the guide groove 17c cut-out upward, and the protruding portion 24b can pass through the guide groove 17c when the tubular portion 22 is inserted into the hole portion 17.

In addition, the rear surface of the protruding portion 24a, the lower surface of the upper tubular portion 21, and the front surface of the pushing-in obstructing portion 23 (connection walls 23a and 23b) constitute a recessed portion 21a having a shape recessed upward. Similarly, the rear surface of the protruding portion 24b, the upper surface of the lower tubular portion 22, and the front surface of the pushing-in obstructing portion 23 (connection walls 23a and 23b) constitute a recessed portion 22a having a shape recessed downward. As will be described in detail below, by disposing the rear wall 12 of the bumper beam 10 in the recessed portions 21a and 22a of the bumper stay 20, the relative displacement in the vehicle front-rear direction of the bumper stay 20 and the bumper beam 10 is restricted.

Figure 6:
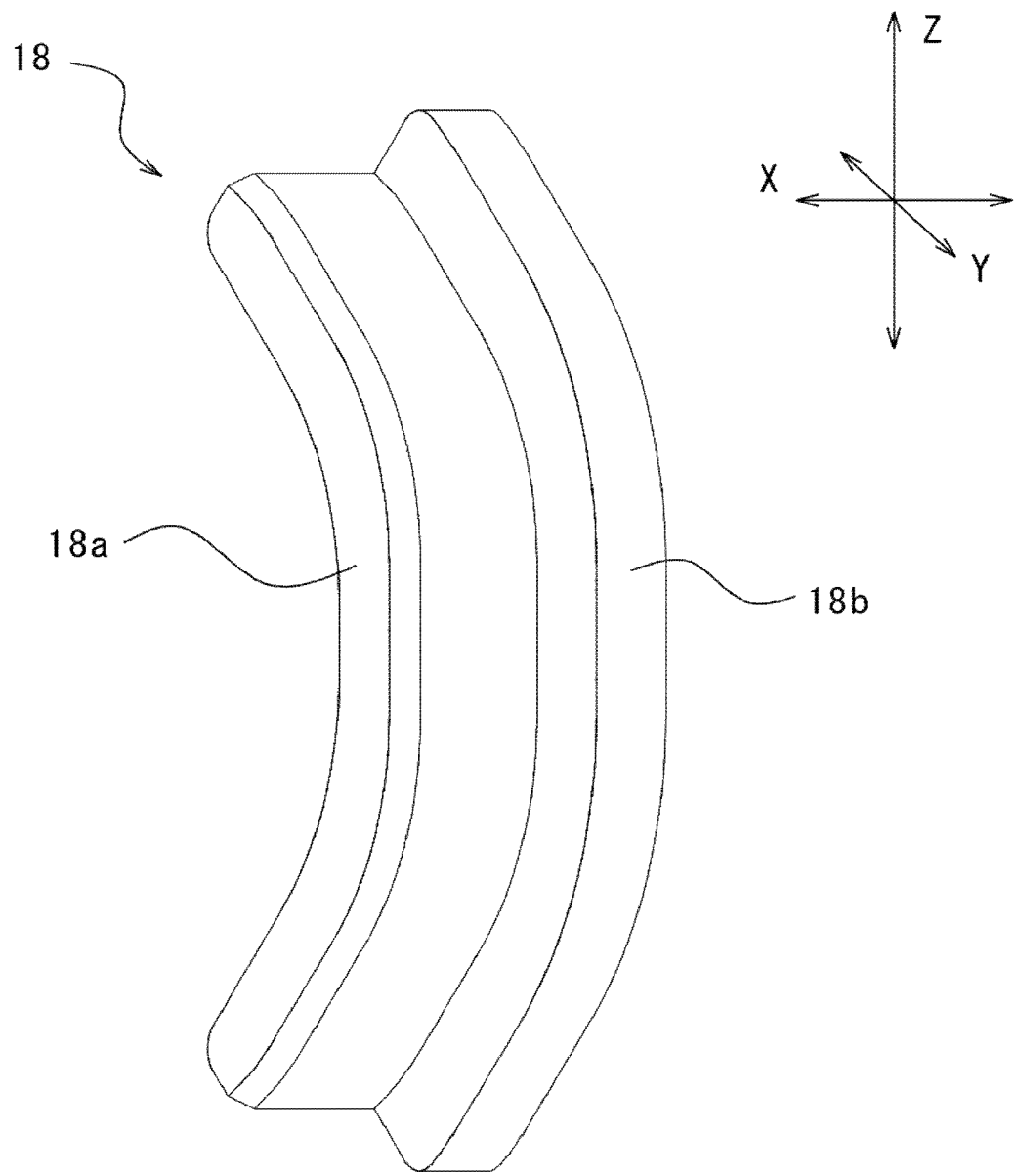
FIG. 6 is a perspective view of a collar member of the bumper system in FIG. 2.
Figure 7:
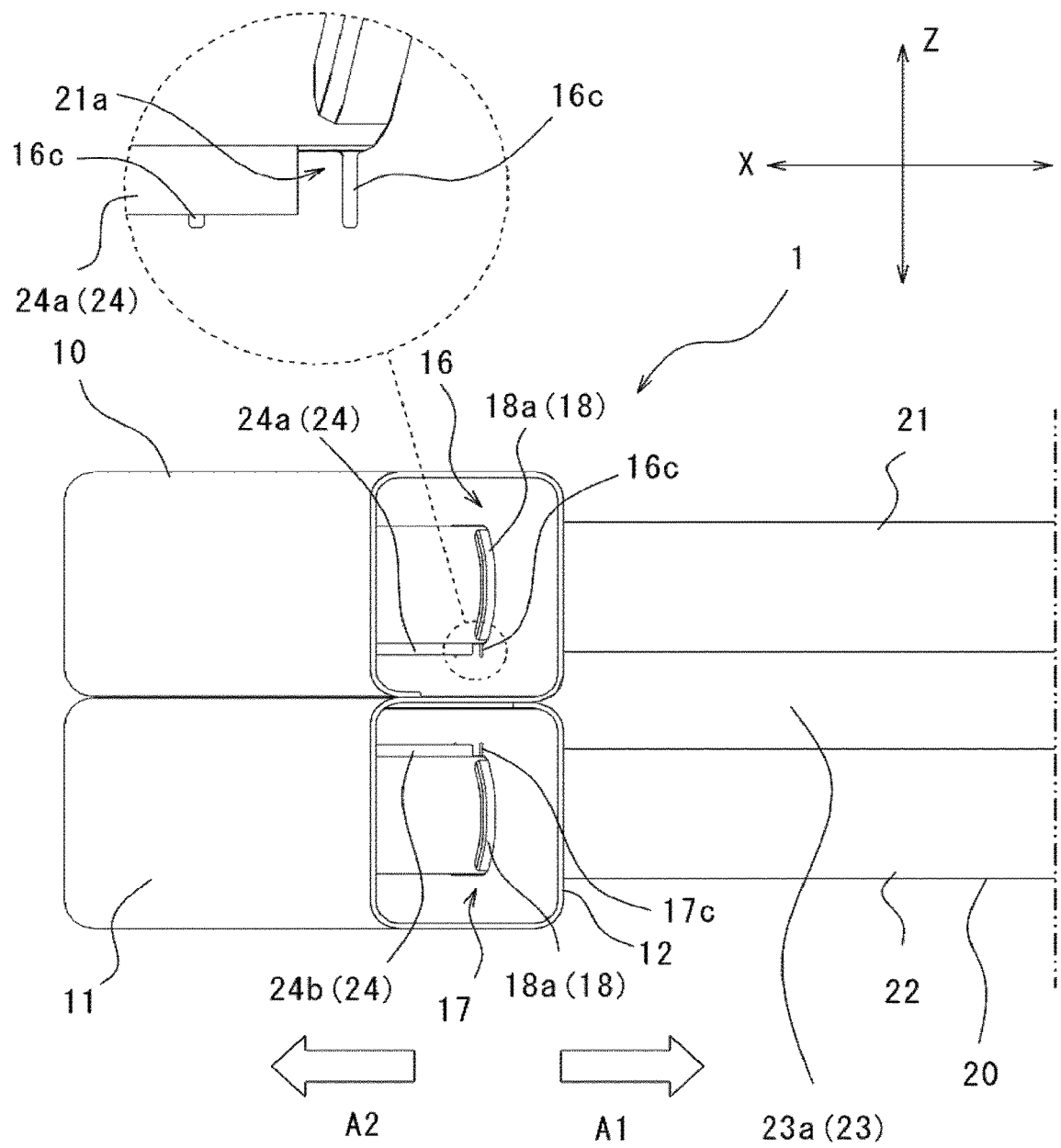
FIG. 7 is a side view near a joint portion of the bumper system in FIG. 2.

Referring to FIGS. 6 and 7, in the present embodiment, the bumper beam 10 includes a collar member 18. The collar members 18 are disposed so as to fill the gaps between the hole edges 16b and 17b and the tubular portions 21 and 22. The collar members 18 have a curved shape along the hole edges 16b and 17b so that the respective collar members 18 are attached to outer portions in the vehicle width direction of the hole edges 16b and 17b.

Specifically, the collar member 18 includes an insertion portion 18a having a C shape and extending in the vehicle front-rear direction, and a flange portion 18b continuous rearward from the insertion portion 18a and having a C shape larger than that of the insertion portion 18a. The insertion portion 18a is a portion to be inserted into the hole portions 16 and 17, and the flange portion 18b is a portion facing and abutting on the rear wall 12 of the bumper beam 10 in the vehicle front-rear direction.

Referring to FIG. 7, the rear walls 12 are disposed in the recessed portions 21a and 22a. Accordingly, the bumper stay 20 is fixed so as not to move in the vehicle front-rear direction with respect to the bumper beam 10. Specifically, the pulling-out obstructing portion 24 prevents the bumper stay 20 from being pulled out from the hole portions 16 and 17, and the pushing-in obstructing portion 23 prevents the bumper stay 20 from being pushed into the hole portions 16 and 17.

The pulling-out obstructing portion 24 abuts on the rear wall 12 of the bumper beam 10 in the direction (see the arrow A1) in which the bumper stay 20 is pulled out from the hole portions 16 and 17. Specifically, in the vehicle front-rear direction, the rear surfaces of the protruding portions 24a and 24b of the pulling-out obstructing portion 24 and the front surface of the rear wall 12 abut on each other. In other words, the pulling-out obstructing portion 24 is configured to be caught by the rear wall 12 when a force is applied in a direction in which the bumper stay 20 is pulled out from the hole portions 16 and 17.

The pushing-in obstructing portion 23 abuts on the rear wall 12 of the bumper beam 10 in the direction (see the arrow A2) in which the bumper stay 20 is pushed into the hole portions 16 and 17. Specifically, in the vehicle front-rear direction, the front surfaces of the connection walls 23a and 23b of the pushing-in obstructing portion 23 and the rear surface of the rear wall 12 abut on each other. In other words, the pushing-in obstructing portion 23 is configured to be caught by the rear wall 12 when a force is applied in a direction in which the bumper stay 20 is pushed into the hole portions 16 and 17.

Next, a method for joining members for the bumper system 1 having the above configuration will be described with reference to FIGS. 8 to 11.

Figure 8:
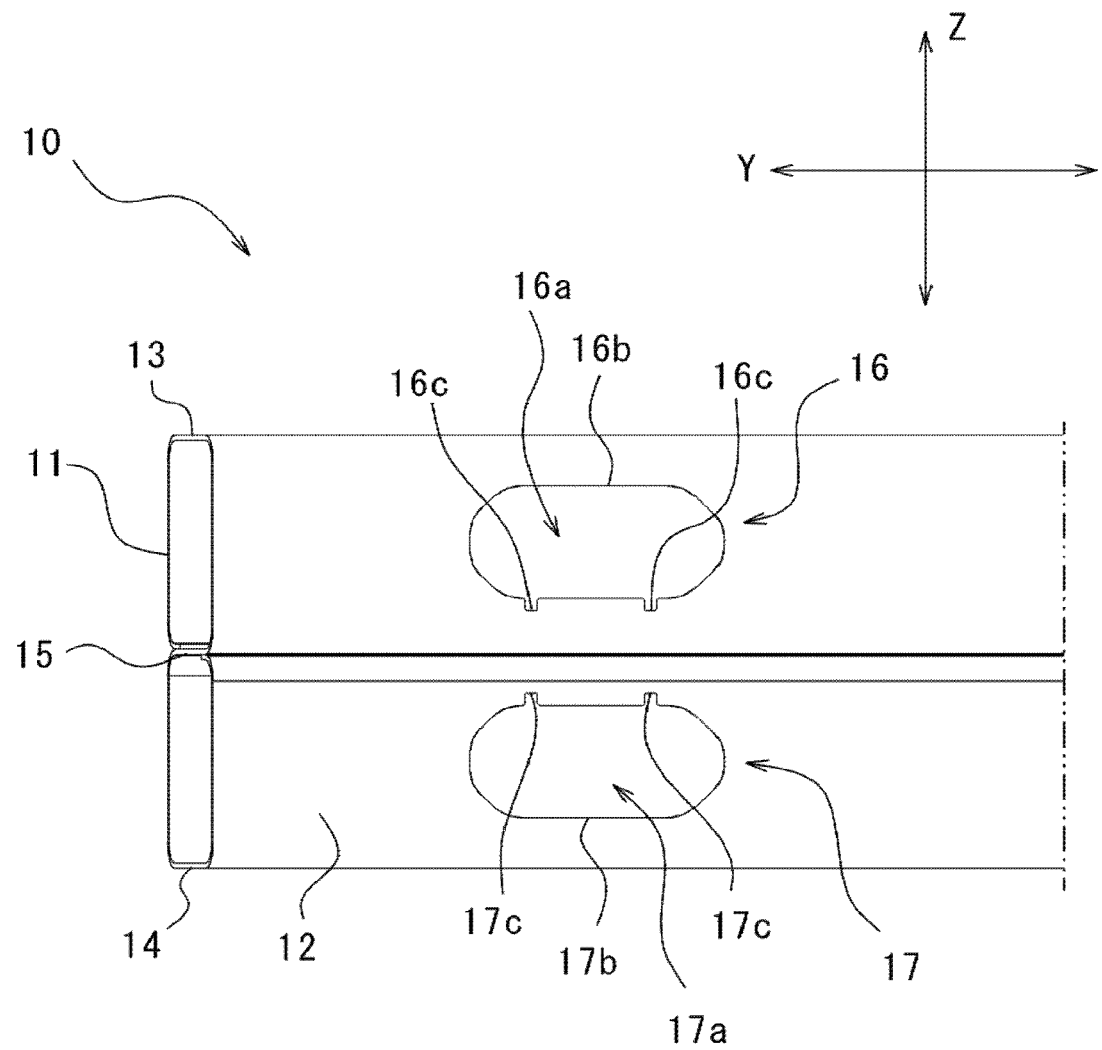
FIG. 8 is a front view of a hole portion of the bumper beam in FIG. 6.
Figure 9:
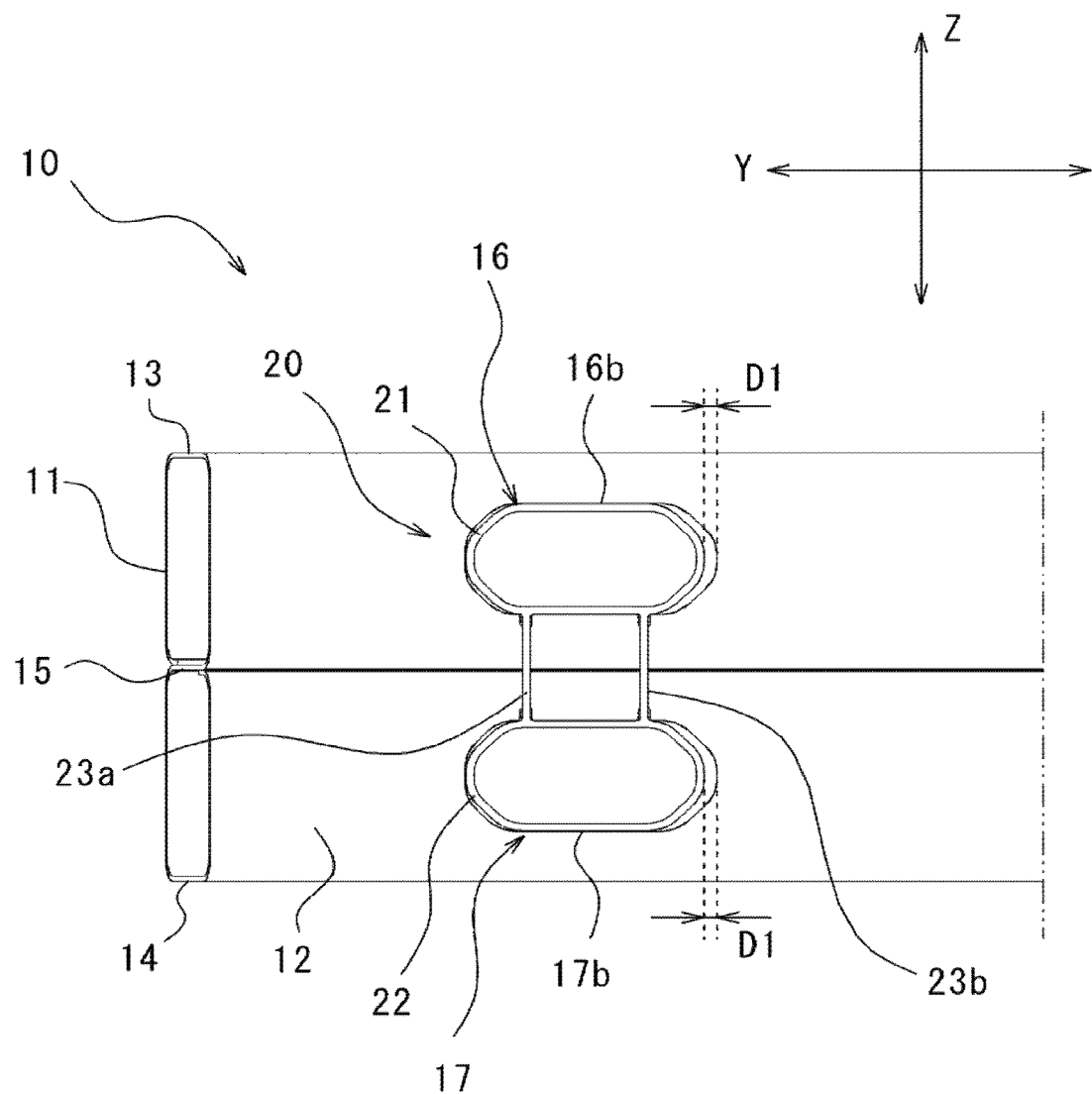
FIG. 9 is a front view in which the bumper stay is inserted into the hole portion of the bumper beam in FIG. 8.

With reference to FIGS. 8 and 9, the tubular portions 21 and 22 of the bumper stay 20 are respectively inserted into the hole portions 16 and 17 of the rear wall 12 of the bumper beam 10. At this time, since passing through the guide grooves 16c and 17c, the pulling-out obstructing portion 24 of the bumper stay 20 is not caught by the rear wall 12. Then, the bumper stay 20 is pushed in until the front end abuts on the front wall 11 of the bumper beam 10. In a state where the front end of the bumper stay 20 abuts on the front wall 11 of the bumper beam 10, the positions in the vehicle front-rear direction of the recessed portions 21a and 22a and the rear wall 12 are aligned. Accordingly, the rear wall 12 is slidable in the vehicle width direction in the recessed portions 21a and 22a (see FIG. 7).

Each of the two hole portions 16 and 17 has a shape into which a corresponding one of the two tubular portions 21 and 22 in the pipe non-expanded state, and the pulling-out obstructing portion 24 can be inserted. The size of each of the two hole portions 16 and 17 is substantially the same as the size of the corresponding one of the two tubular portions 21 and 22 in the vehicle vertical direction, but is larger than the two tubular portions 21 and 22 by the gap D1 in the vehicle width direction. In a state where the pulling-out obstructing portion 24 is pushed in vehicle frontward through the guide grooves 16c and 17c, a gap D1 is generated between each of the tubular portions 21 and 22 and a corresponding one of the hole edges 16b and 17b, in the inner portion in the vehicle width direction of a corresponding one of the two hole portions 16 and 17. That is, there is room for the bumper stay 20 to move inward in the vehicle width direction by the gap D1.

Figure 10:
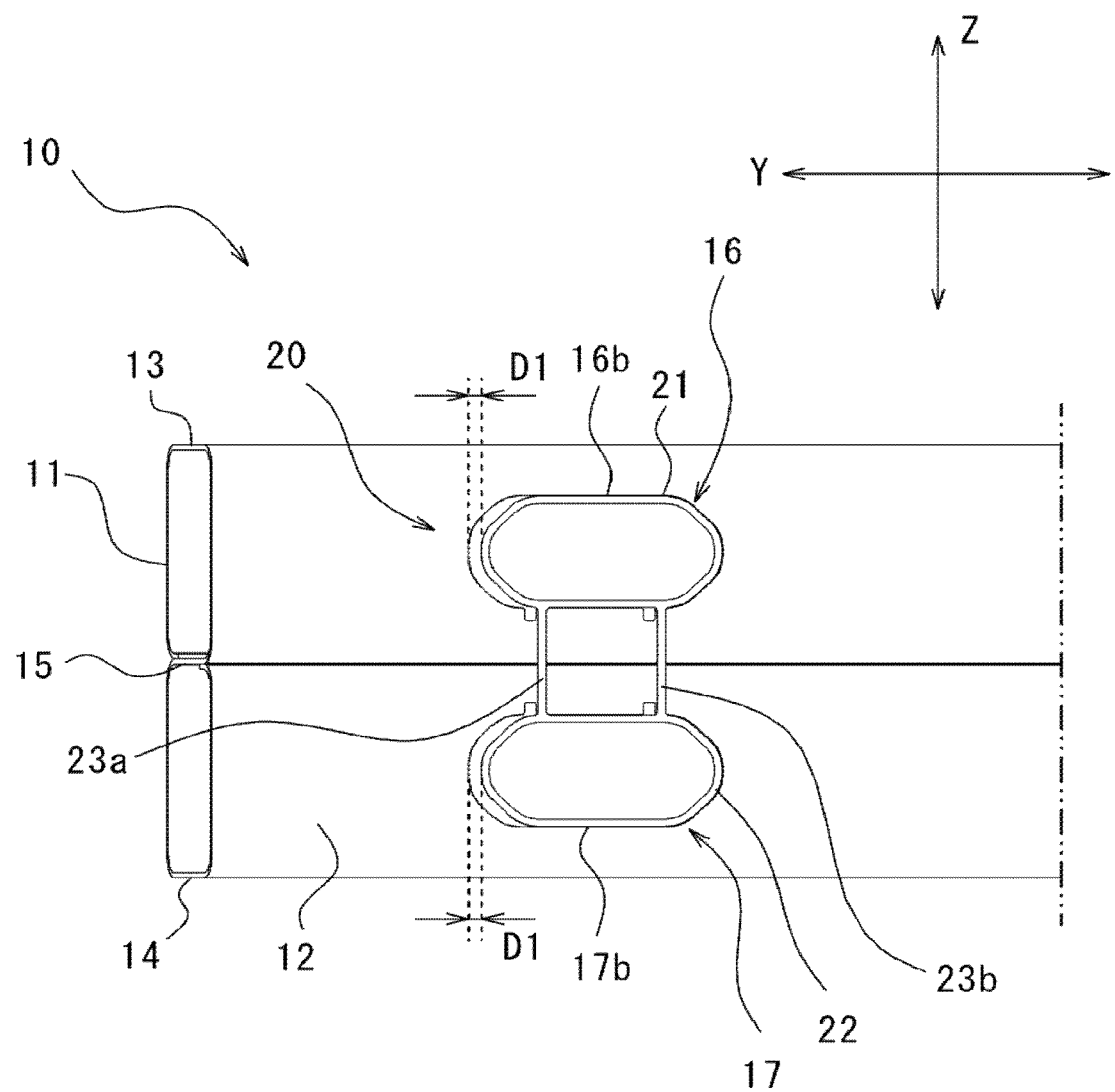
FIG. 10 is a front view in which the bumper stay in FIG. 9 is slid in the vehicle width direction.

Referring to FIG. 10, the bumper stay 20 is moved inward in the vehicle width direction by the gap D1 from the state in FIG. 9. At this time, the rear wall 12 slides inward in the vehicle width direction in the recessed portions 21a and 22a, and the bumper stay 20 is fixed so as not to move in the vehicle front-rear direction with respect to the bumper beam 10 (see FIG. 7). As a result, the gap D1 (see FIG. 9) in the inner portion in the vehicle width direction of each of the two hole portions 16 and 17 disappears, and the gap D1 is generated in the outer portion in the vehicle width direction (see FIG. 10).

Figure 11:
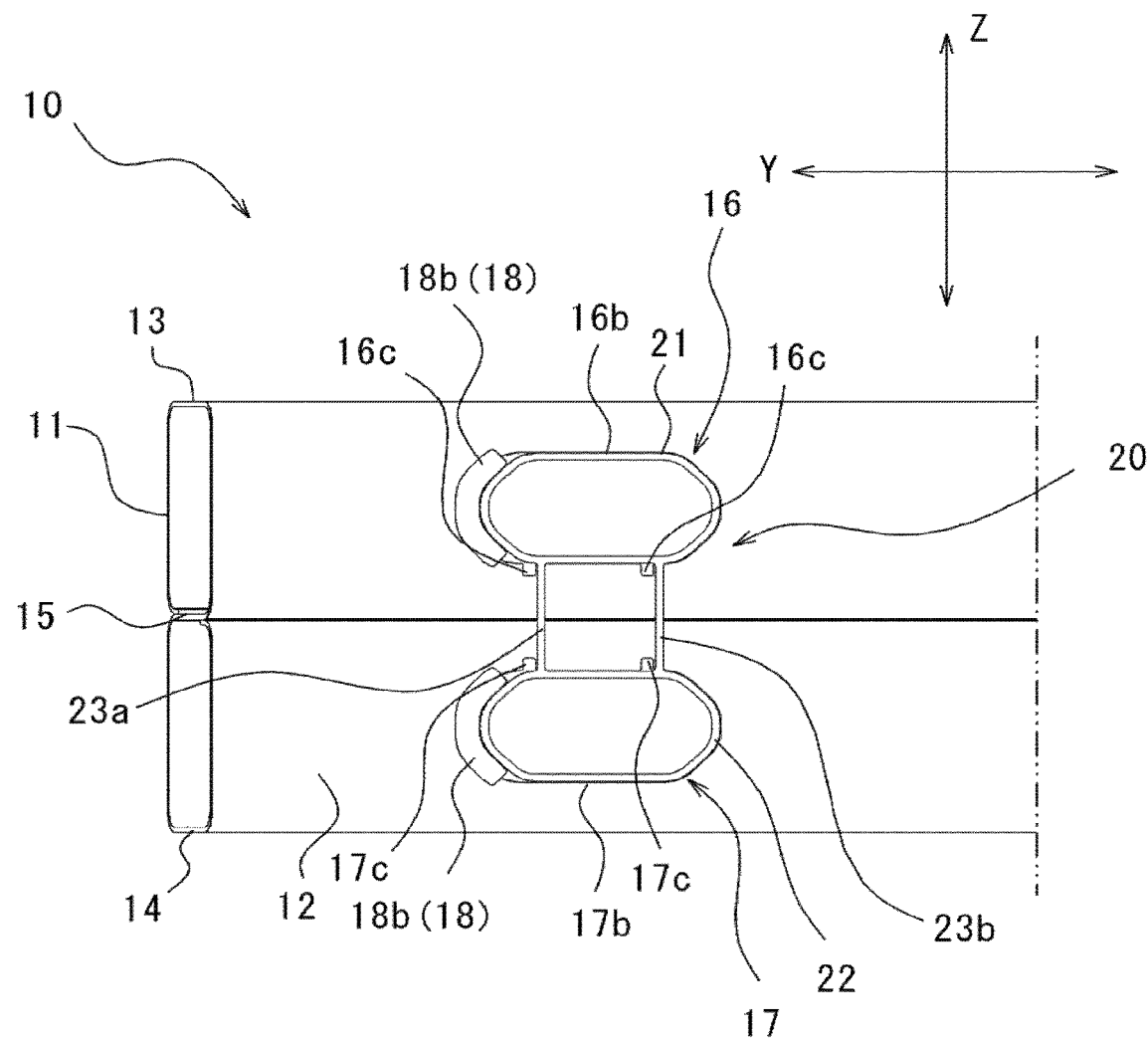
FIG. 11 is a front view in which a collar member is disposed in a hole portion of the bumper beam in FIG. 10.

Referring to FIG. 11, the collar members 18 are attached so as to fill the gaps D1 generated in the outer portions of the hole portions 16 and 17 in the vehicle width direction in the state in FIG. 10. The collar members 18 are attached so as to push the insertion portions 18a (see FIG. 6) into the hole portions 16 and 17, and the flange portions 18b and the rear wall 12 abut on each other.

Although not shown in detail, after the collar member 18 is attached as shown in FIG. 11, a columnar rubber member (elastic body) is inserted into each of the two tubular portions 21 and 22, and the rubber member is disposed so as to straddle the rear wall 12 in the vehicle front-rear direction. Thereafter, by compressing the rubber member in the vehicle front-rear direction, the rubber member is bulged in a direction perpendicular to the vehicle front-rear direction, and each of the two tubular portions 21 and 22 is expanded by pipe expansion. By this pipe expansion, the tubular portions 21 and 22 are respectively pressure-welded (pipe expansion joined) to the hole portions 16 and 17 (see FIG. 3). That is, the bumper stay 20 is joined to the hole portions 16 and 17 of the bumper beam 10 by rubber bulge joining. Unlike welding, the rubber bulge joining can be performed even when qualities of material of two members (the bumper beam 10 and the bumper stay 20) to be joined are different from each other.

In this way, the bumper system 1 of the present embodiment is manufactured.

According to the present embodiment, even when a force is applied in a direction in which the tubular portions 21 and 22 are respectively pulled out from the hole portions 16 and 17, since the pulling-out obstructing portion 24 is caught by the rear wall 12 of the bumper beam 10, it is possible to prevent the tubular portions 21 and 22 from being pulled out from the hole portions 16 and 17, respectively. Therefore, in the bumper system 1, high joining strength and reliability can be secured as a joined body. In particular, in the present embodiment, rubber bulge joining is adopted. In the rubber bulge joining, since there are few restrictions on the material and shape of the member to be pipe-expanded and uniform pipe expansion is possible, high joining strength can be easily secured.

In addition, according to the present embodiment, from the viewpoint of ease of manufacturing, the pulling-out obstructing portion 24 is configured not to be caught by the rear wall 12 when the tubular portions 21 and 22 are pushed into the hole portions 16 and 17, but to be caught by the rear wall 12 when the tubular portions 21 and 22 are pulled out from the hole portions 16 and 17. Therefore, the bumper system 1 can be easily manufactured.

In addition, according to the present embodiment, it is possible to fill the gap D1 between the tubular portions 21 and 22 and the hole portions 16 and 17 with the collar member 18, increase the degree of adhesion between the tubular portions 21 and 22 and the hole portions 16 and 17, and increase the joining strength of pipe expansion joining (rubber bulge joining in the present embodiment).

In addition, according to the present embodiment, even when a force is applied in a direction in which the tubular portions 21 and 22 are respectively pushed into the hole portions 16 and 17, since the pushing-in obstructing portion 23 is caught by the rear wall 12, it is possible to prevent the bumper stay 20 from penetrating. Therefore, the joining strength of pipe expansion joining (rubber bulge joining in the present embodiment) can be further enhanced, and higher reliability can be secured as the bumper system 1.

In addition, according to the present embodiment, since the bumper beam 10 and the bumper stay 20 made of different qualities of material are used, multi-materialization is achieved. In particular, in multi-materialization, joining of dissimilar materials is a problem, but the bumper system 1 having high joining strength can be achieved by rubber bulge joining.

Second Embodiment

Figure 12:
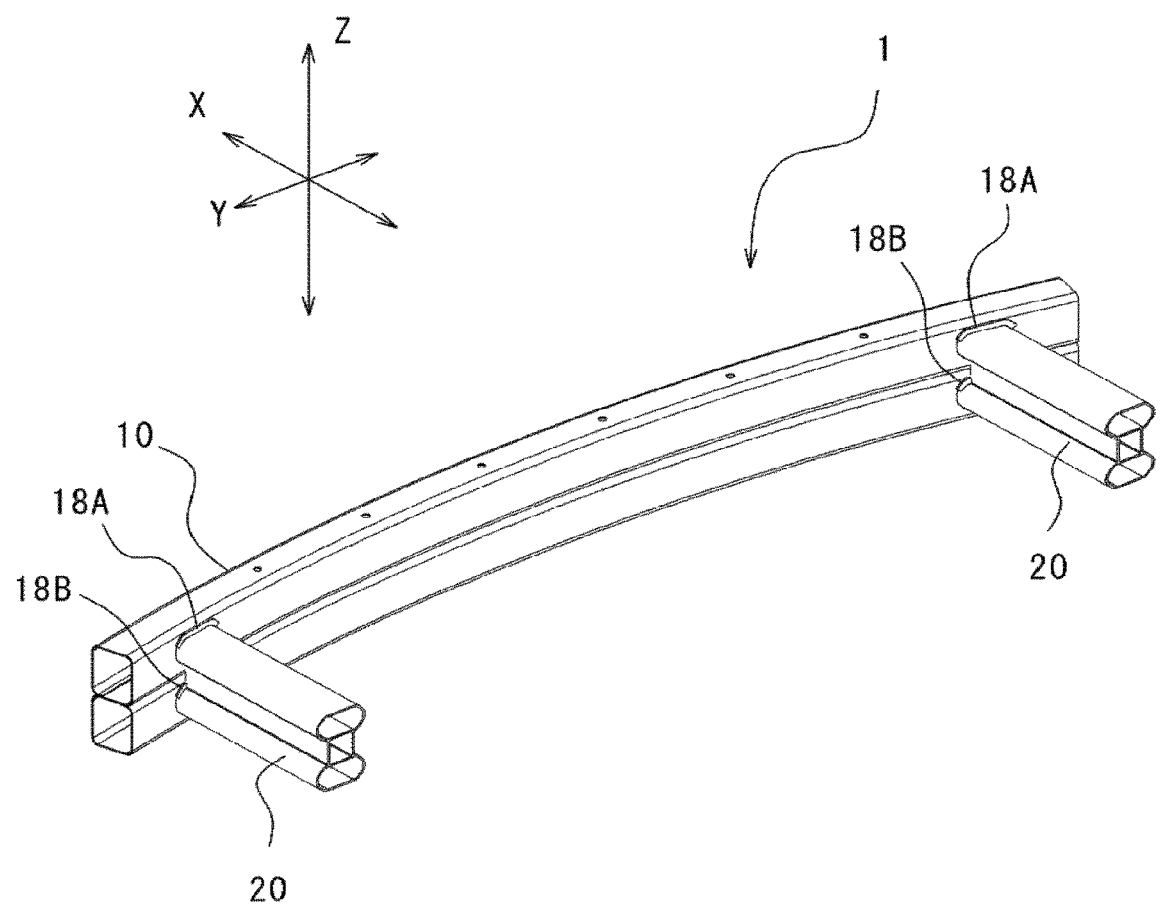
FIG. 12 is a perspective view before rubber bulge joining of a bumper system according to a second embodiment.

A bumper system 1 of a second embodiment shown in FIG. 12 is substantially the same as that of the first embodiment except for a configuration related to a joint portion between the bumper beam 10 and the bumper stay 20. Therefore, description of the portions shown in the first embodiment may be omitted.

Figure 13:
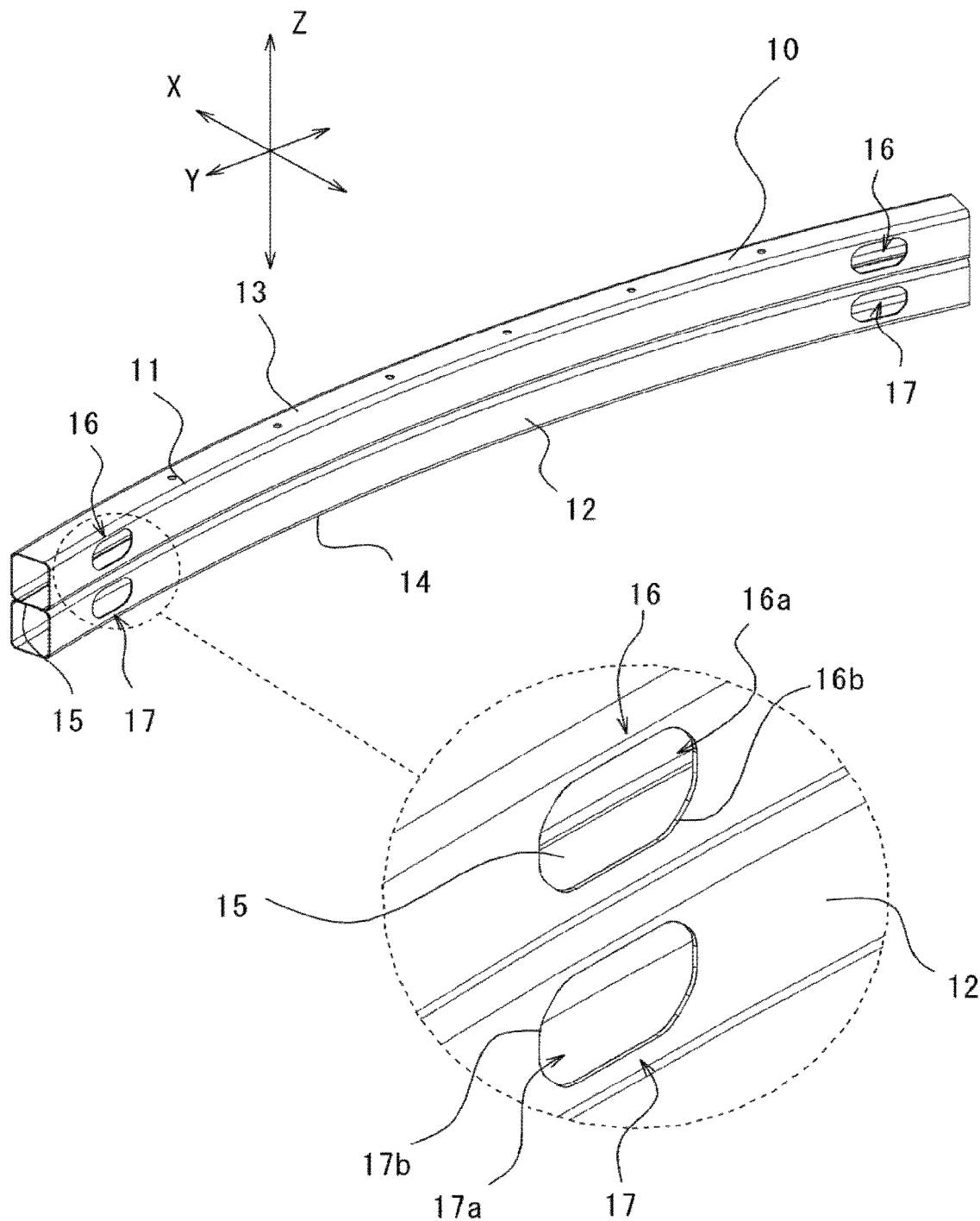
FIG. 13 is a perspective view of a bumper beam of the bumper system in FIG. 12.

Referring to FIG. 13, in the present embodiment, the guide grooves 16c and 17c (see FIG. 4) are not provided in the hole portions 16 and 17 of the rear wall 12 of the bumper beam 10. The hole portions 16 and 17 include through-holes 16a and 17a penetrating the rear wall 12 in the vehicle front-rear direction, and hole edges 16b and 17b defining the through-holes 16a and 17a and having a simple corner-rounded rectangular shape (track shape) when viewed from the vehicle front-rear direction, respectively.

Figure 14:
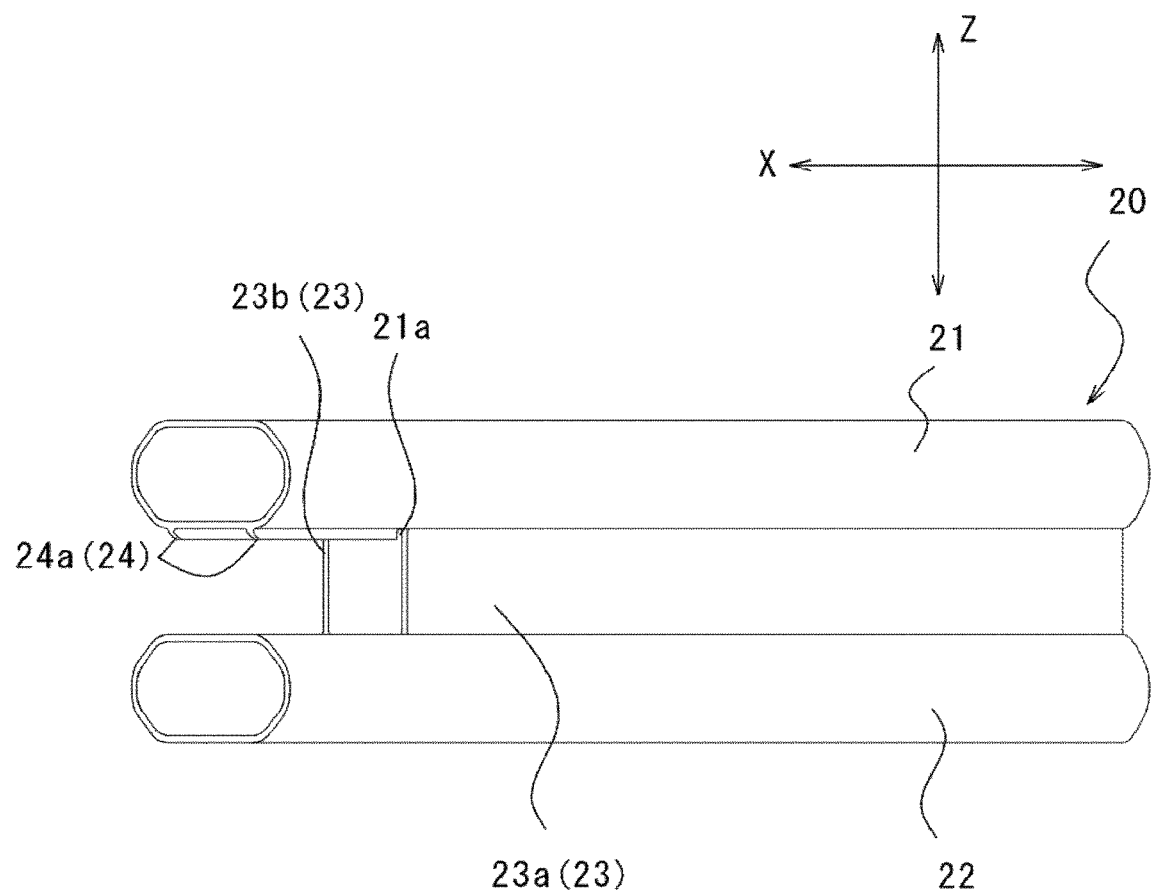
FIG. 14 is a perspective view of a bumper stay of the bumper system in FIG. 12.

Referring to FIG. 14, in the present embodiment, the protruding portion 24b (see FIG. 5) is not provided in the lower tubular portion 22 of the bumper stay 20. It should be noted that the upper tubular portion 21 is provided with a protruding portion (pulling-out obstructing portion) 24a as in the first embodiment. Therefore, in the present embodiment, the recessed portion 21a is provided only in the upper tubular portion 21. By disposing the rear wall 12 in the recessed portion 21a, the bumper stay 20 is fixed so as not to move in the vehicle front-rear direction with respect to the bumper beam 10 as in the first embodiment.

Figure 15:
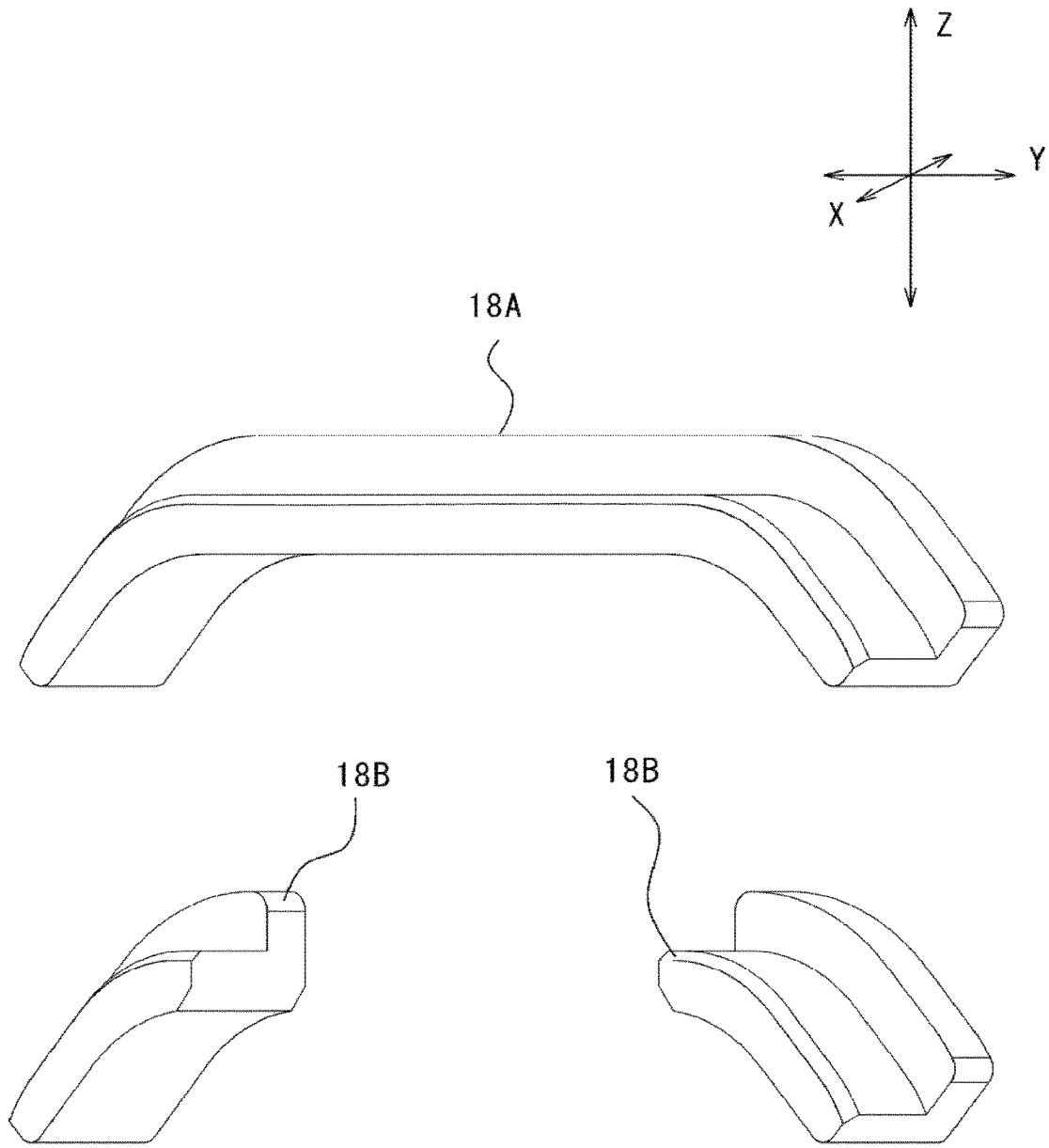
FIG. 15 is a perspective view of a collar member of the bumper system in FIG. 12.
Figure 16:
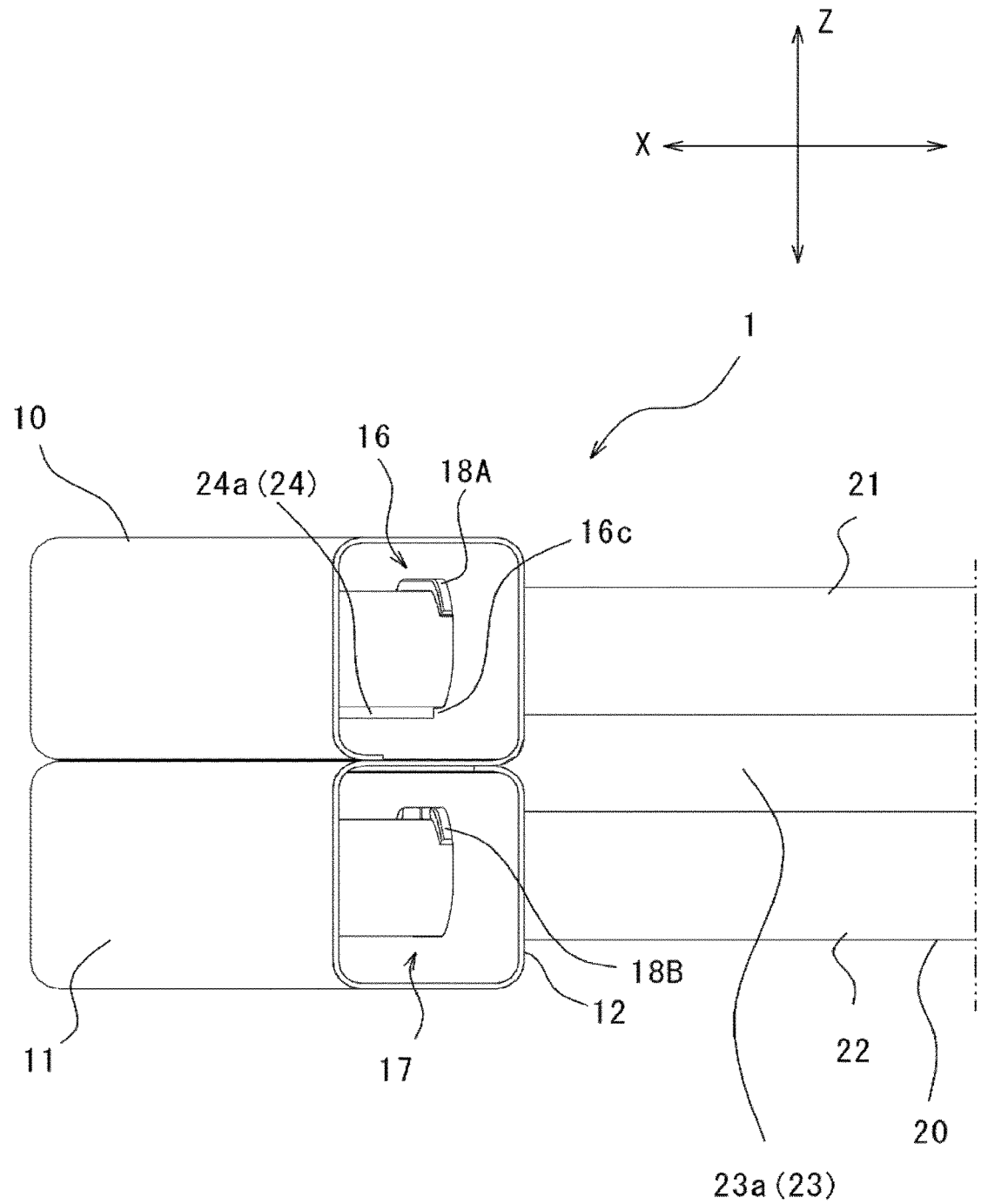
FIG. 16 is a side view near a joint portion of the bumper system in FIG. 12.

Referring to FIGS. 15 and 16, in the present embodiment, two types of collar members 18A and 18B are used. The two types of collar members 18A and 18B have curved shapes along the hole edges 16b and 17b so that both are respectively attached to upper portions in the vehicle vertical direction of the hole edges 16b and 17b. One collar member 18A of the two types of collar members 18A and 18B is attached over the entire upper portions of the hole edges 16b and 17b, and the other collar member 18B is attached to both corners of the upper portions of the hole edges 16b and 17b in a spaced apart manner.

Next, a method for joining members for the bumper system 1 having the above configuration will be described with reference to FIGS. 17 to 20.

Figure 17:
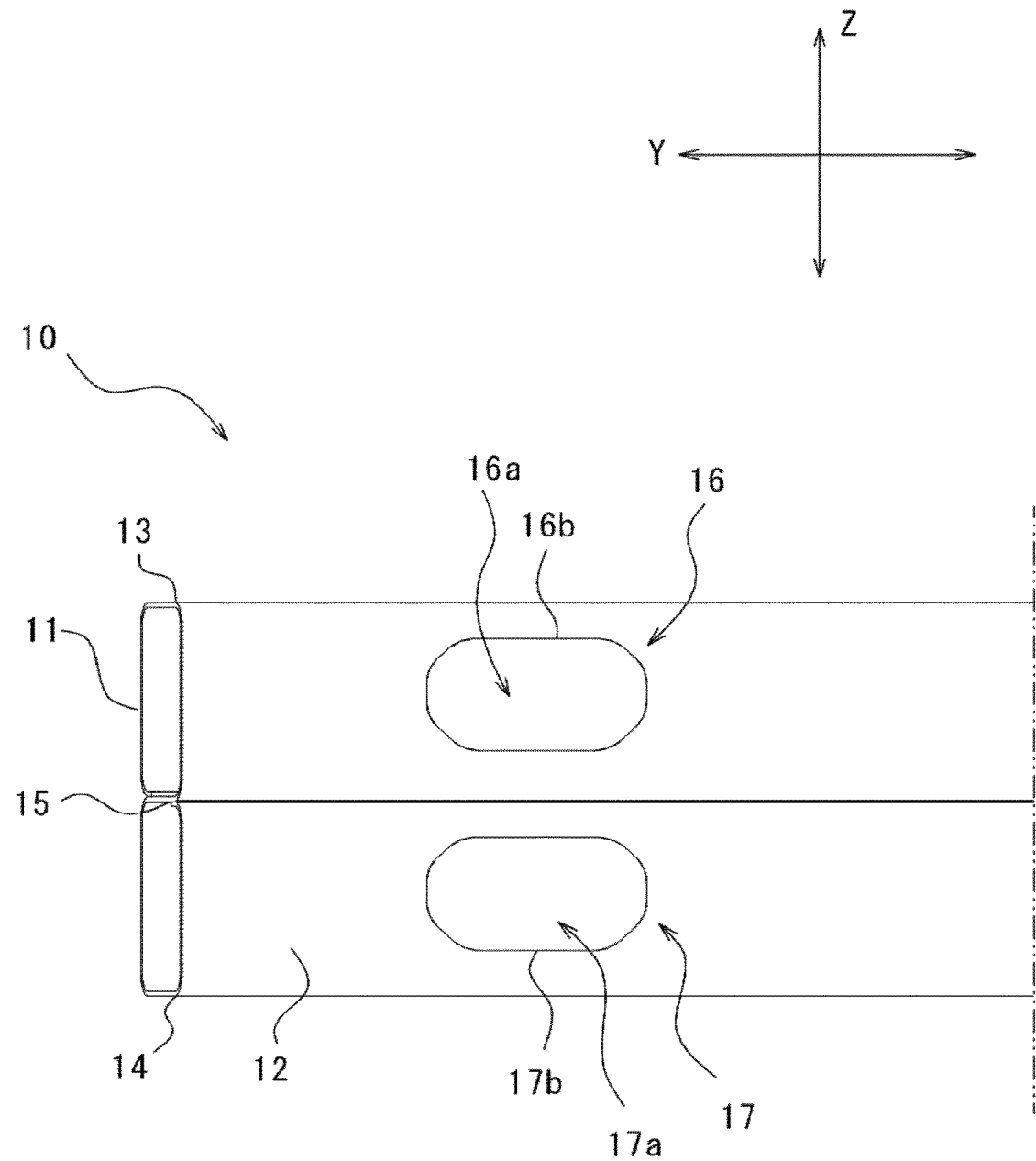
FIG. 17 is a front view showing a hole portion of the bumper beam in FIG. 13.
Figure 18:
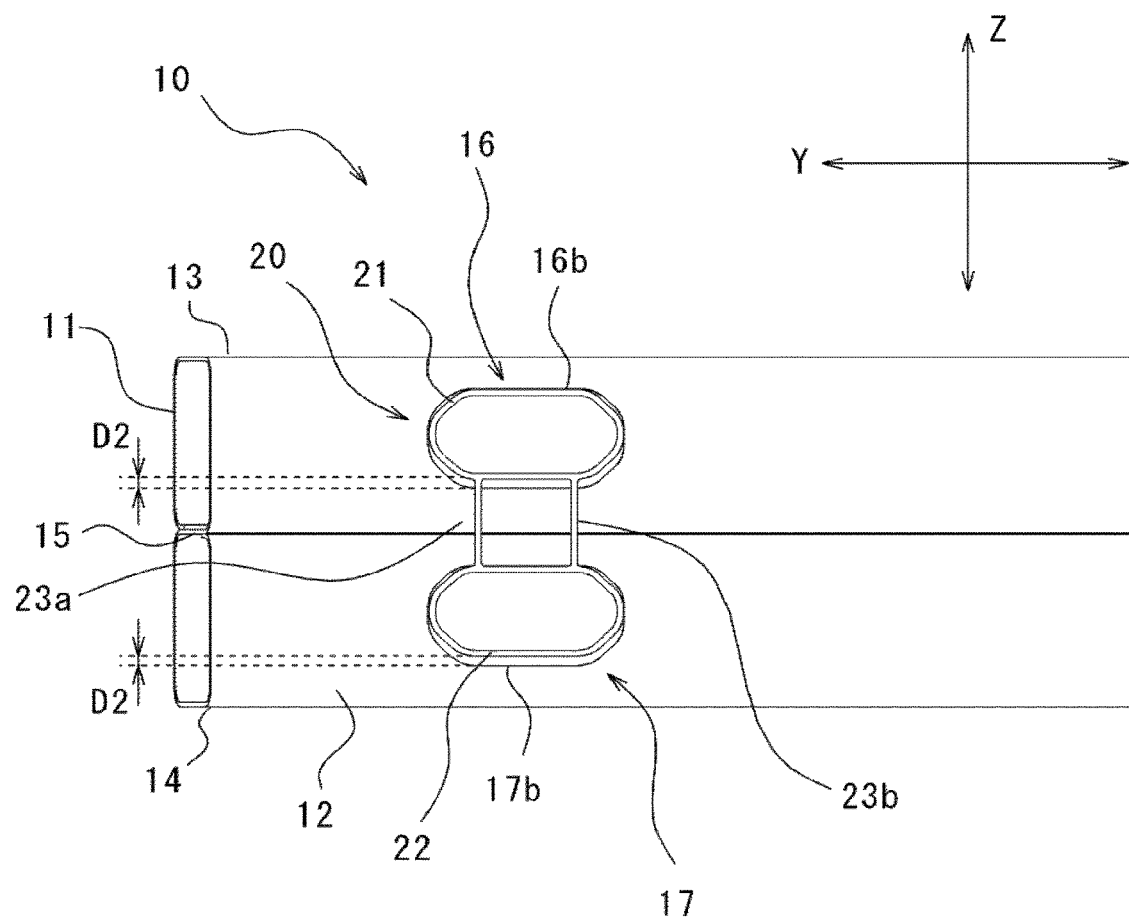
FIG. 18 is a front view in which the bumper stay is inserted into the hole portion of the bumper beam in FIG. 17.

With reference to FIGS. 17 and 18, the tubular portions 21 and 22 of the bumper stay 20 are respectively inserted into the hole portions 16 and 17 of the rear wall 12 of the bumper beam 10. The bumper stay 20 is pushed in until the front end abuts on the front wall 11 of the bumper beam 10. In a state where the front end of the bumper stay 20 abuts on the front wall 11 of the bumper beam 10, the positions in the vehicle front-rear direction of the recessed portion 21a and the rear wall 12 are aligned (see FIG. 16).

Each of the two hole portions 16 and 17 has a shape into which a corresponding one of the two tubular portions 21 and 22 in the pipe non-expanded state, and the pulling-out obstructing portion 24 can be inserted. The size of each of the two hole portions 16 and 17 is substantially the same as the size of the corresponding one of the two tubular portions 21 and 22 in the vehicle width direction, but is larger than the two tubular portions 21 and 22 by the gap D2 in the vehicle vertical direction. The protrusion amount of the protruding portion 24a (see FIG. 14) of the bumper stay 20 is smaller than the gap D2, and the tubular portion 21 and the pulling-out obstructing portion 24 can be inserted into the hole portion 16. In the inserted state, gaps D2 are generated between the tubular portions 21 and 22 and the hole edges 16b and 17b in the lower portions in the vehicle vertical direction of the two respective hole portions 16 and 17. That is, there is room for the bumper stay 20 to move downward in the vehicle vertical direction by the gap D2.

Figure 19:
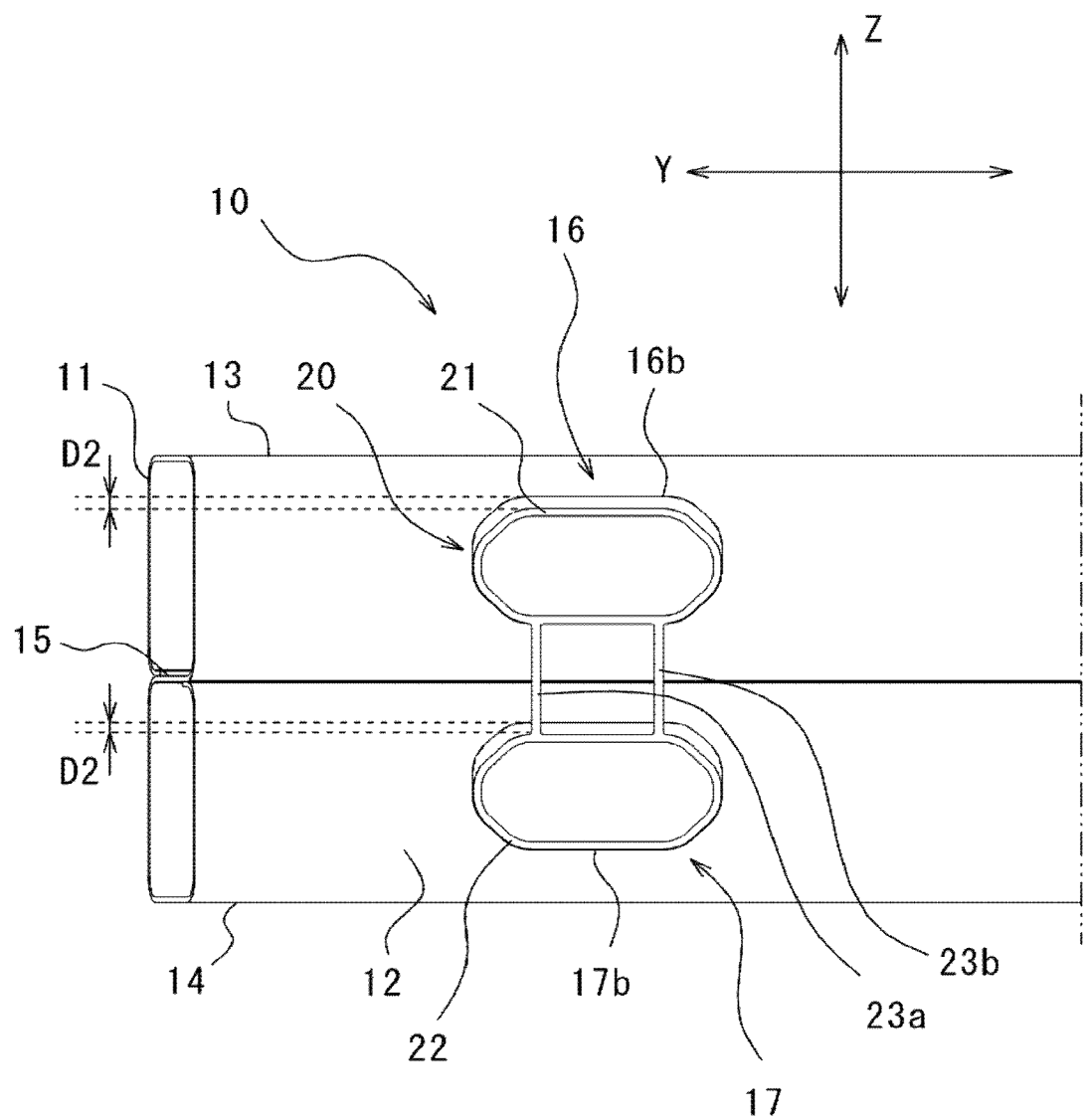
FIG. 19 is a front view in which the bumper stay in FIG. 18 is slid in the vehicle vertical direction.

Referring to FIG. 19, the bumper stay 20 is moved downward in the vehicle vertical direction by the gap D2 from the state in FIG. 18. At this time, the rear wall 12 is disposed in the recessed portion 21a, and the bumper stay 20 is fixed so as not to move in the vehicle front-rear direction with respect to the bumper beam 10 (see FIG. 16). As a result, the gaps D2 (see FIG. 18) in the lower portions in the vehicle vertical direction of the two respective hole portions 16 and 17 disappear, and the gaps D2 are generated in the upper portions in the vehicle vertical direction (see FIG. 19).

Figure 20:
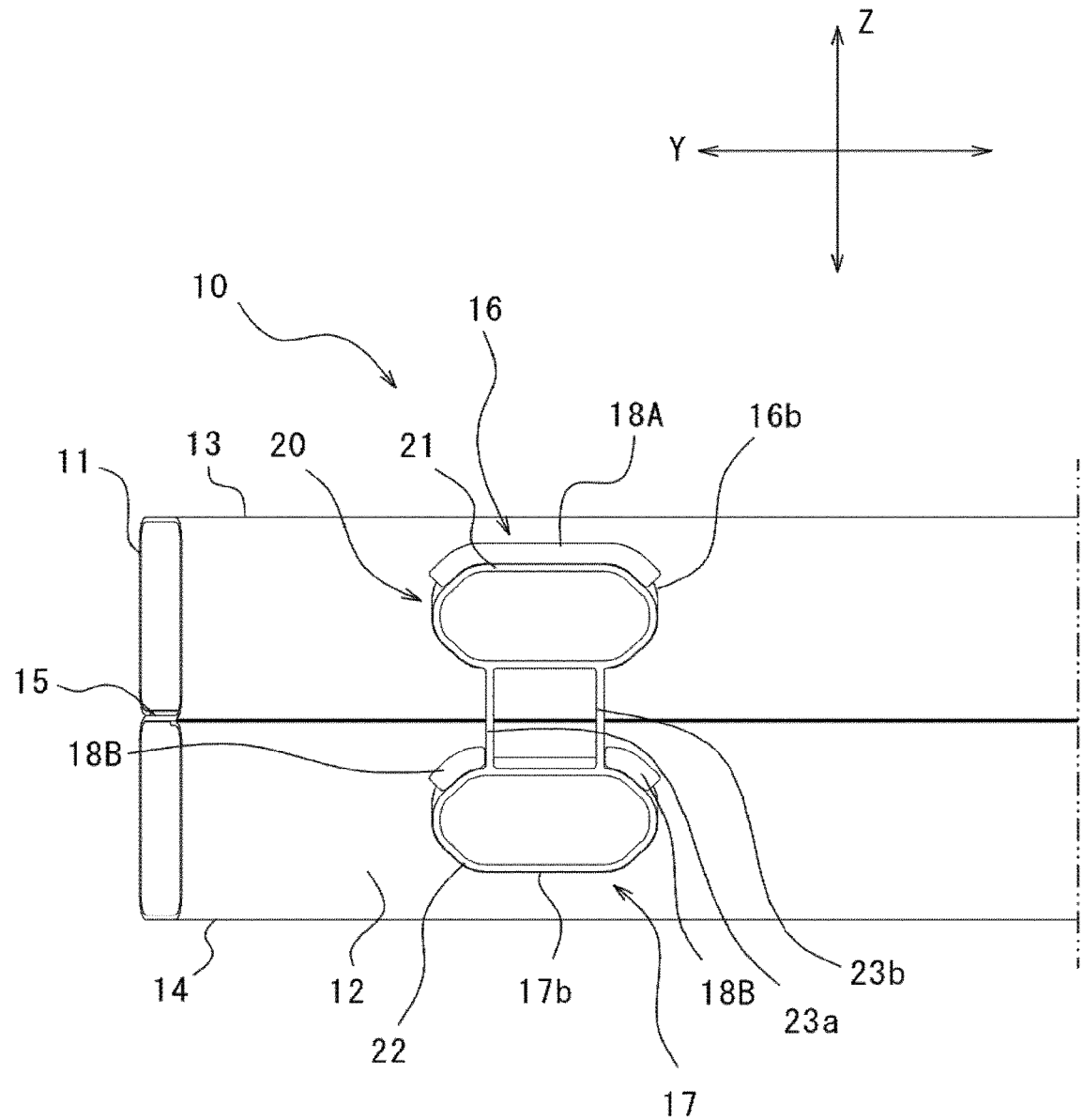
FIG. 20 is a front view in which a collar member is disposed in a hole portion of the bumper beam in FIG. 19.

Referring to FIG. 20, the collar members 18A and 18B are respectively attached so as to fill the gaps D2 generated in the upper portions in the vehicle vertical direction of the hole portions 16 and 17 in the state in FIG. 19.

Although not shown in detail, after the collar members 18A and 18B are attached as shown in FIG. 20, a columnar rubber member (elastic body) is inserted into each of the two tubular portions 21 and 22, and the rubber member is disposed so as to straddle the rear wall 12 in the vehicle front-rear direction. Thereafter, by compressing the rubber member in the vehicle front-rear direction, the rubber member is bulged in a direction perpendicular to the vehicle front-rear direction, and each of the two tubular portions 21 and 22 is expanded by pipe expansion. By this pipe expansion, the two tubular portions 21 and 22 are respectively pressure-welded (pipe expansion joined) to the two hole portions 16 and 17. That is, the bumper stay 20 is joined to the hole portions 16 and 17 of the bumper beam 10 by rubber bulge joining.

In this way, the bumper system 1 of the present embodiment is manufactured.

The action and effect of the bumper system 1 of the present embodiment are substantially the same as those of the first embodiment.

Third Embodiment

Figure 21:
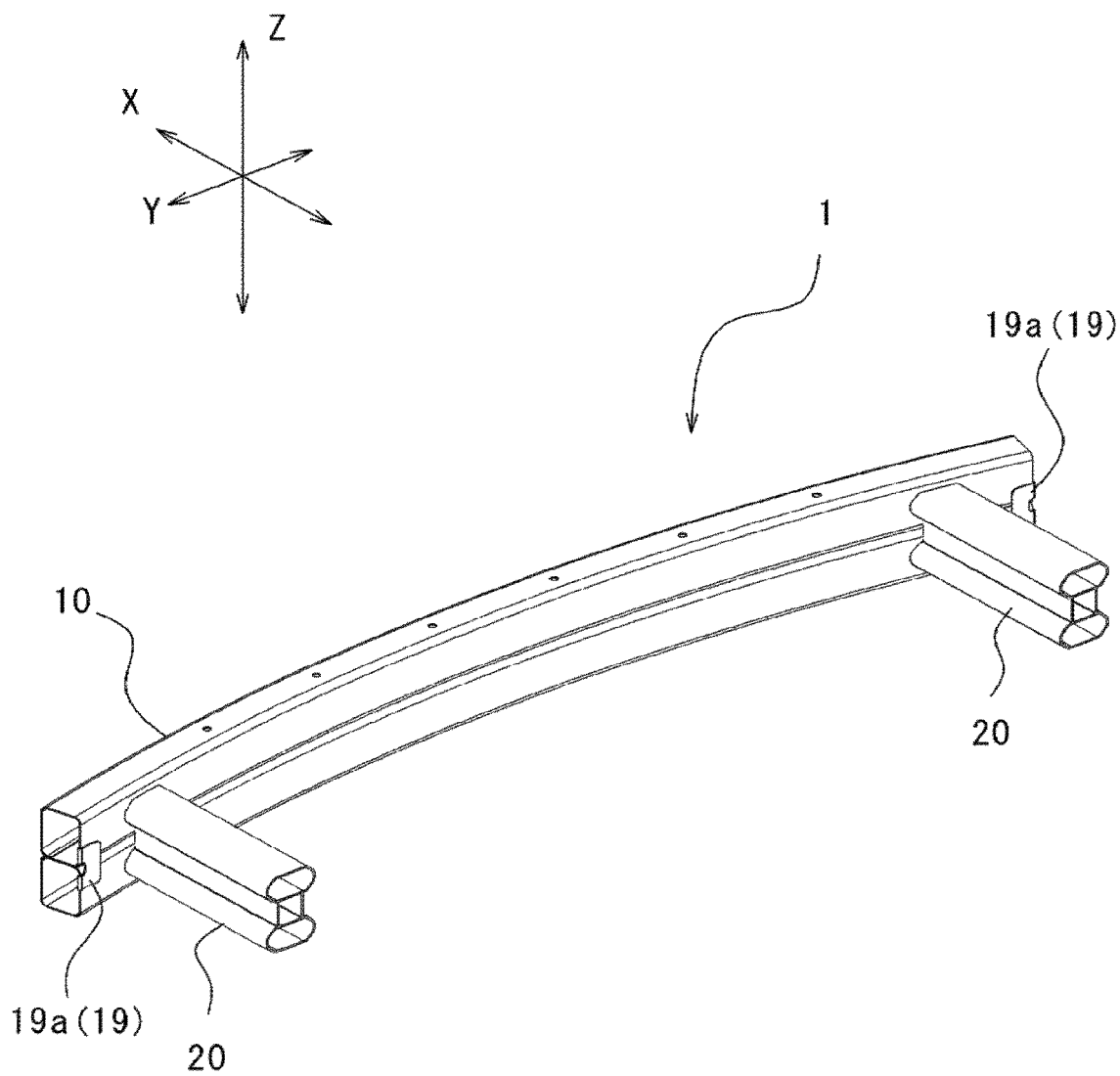
FIG. 21 is a perspective view before rubber bulge joining of a bumper system according to a third embodiment.

A bumper system 1 of a third embodiment shown in FIG. 21 includes a lock member 19. The configuration other than the configuration related to the lock member 19 is substantially the same as that of the first embodiment. Therefore, description of the portions shown in the first embodiment may be omitted.

Figure 22:
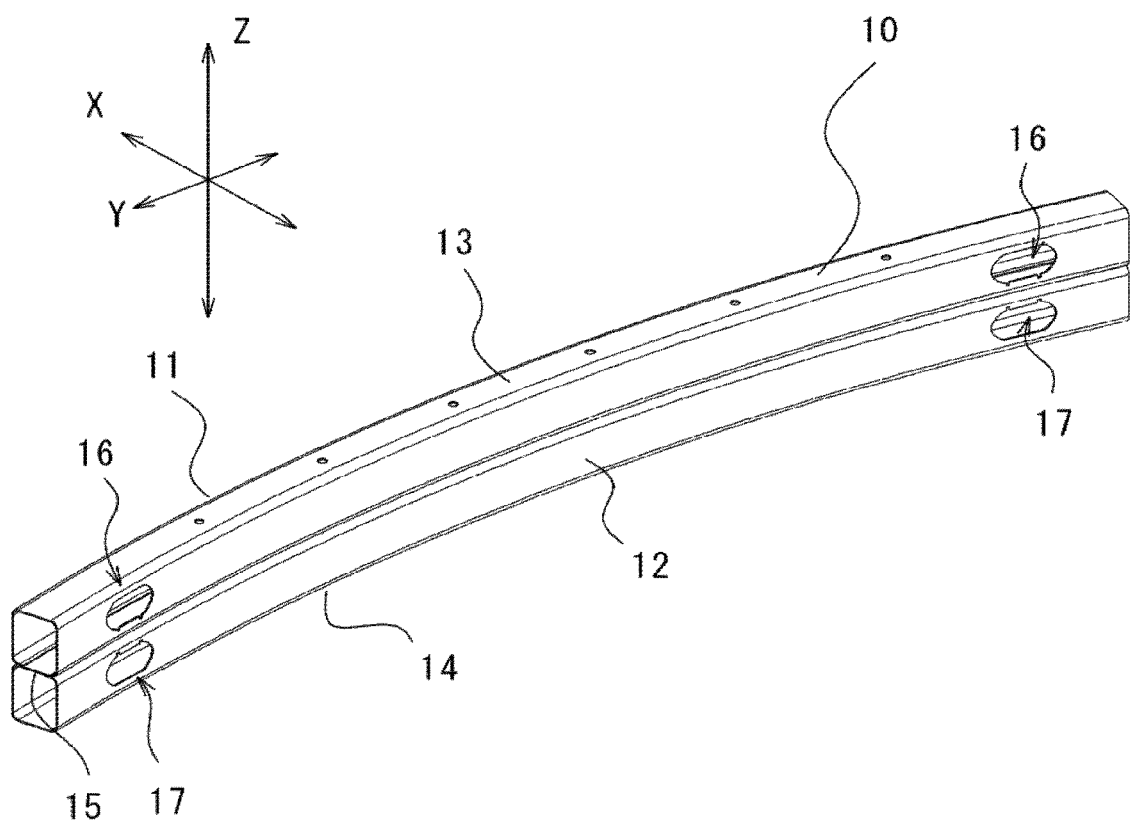
FIG. 22 is a perspective view of a bumper beam of the bumper system in FIG. 21.

Referring to FIG. 22, in the present embodiment, the shape of the bumper beam 10 is substantially the same as the shape of the bumper beam 10 in the first embodiment. However, unlike the first embodiment, the sizes of the hole portions 16 and 17 are respectively substantially the same as those of the tubular portions 21 and 22 in both the vehicle vertical direction and the vehicle width direction. Therefore, when the tubular portions 21 and 22 are respectively inserted into the hole portions 16 and 17, no gap is generated in both the vehicle vertical direction and the vehicle width direction.

Figure 23:
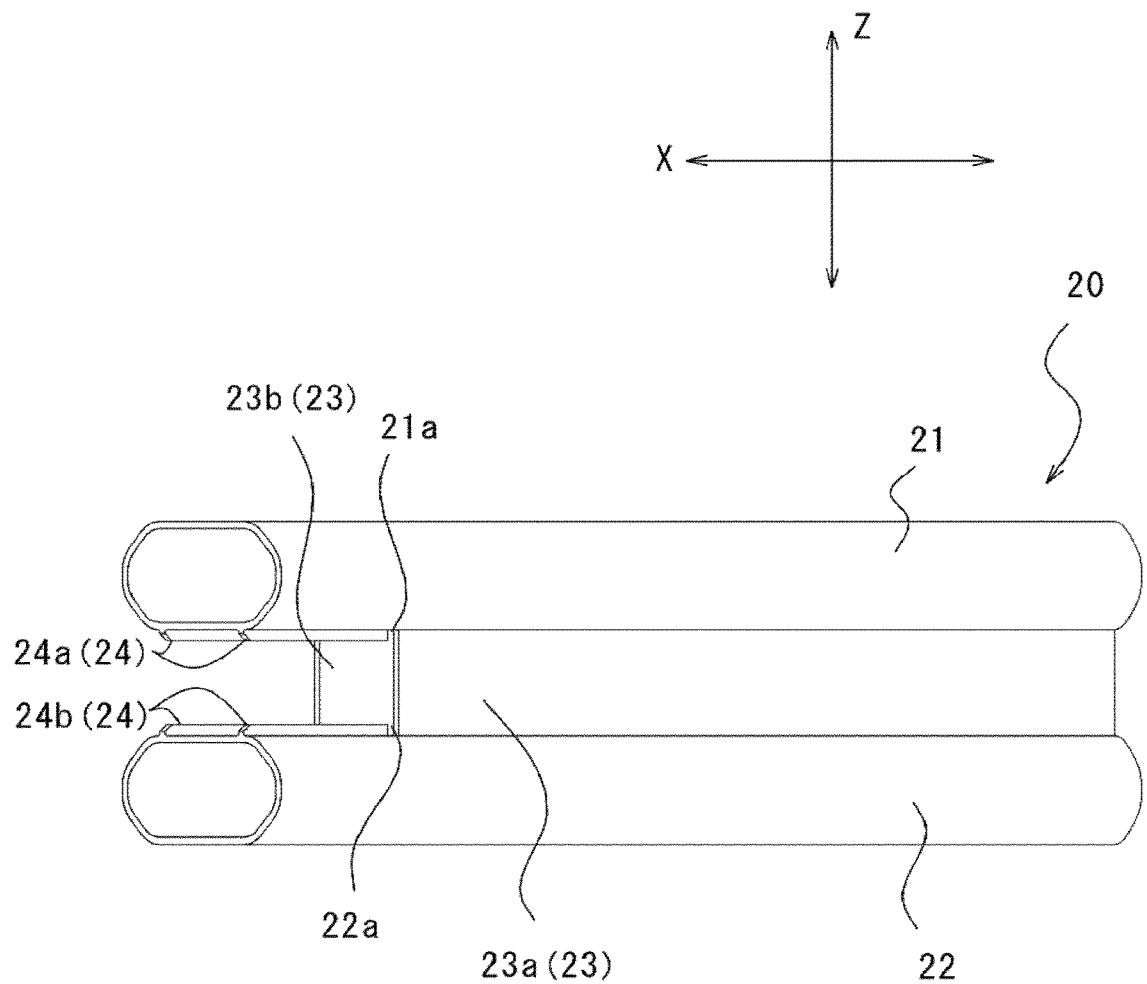
FIG. 23 is a perspective view of a bumper stay of the bumper system in FIG. 21.

Referring to FIG. 23, the bumper stay 20 is the same as that of the first embodiment.

Figure 24:
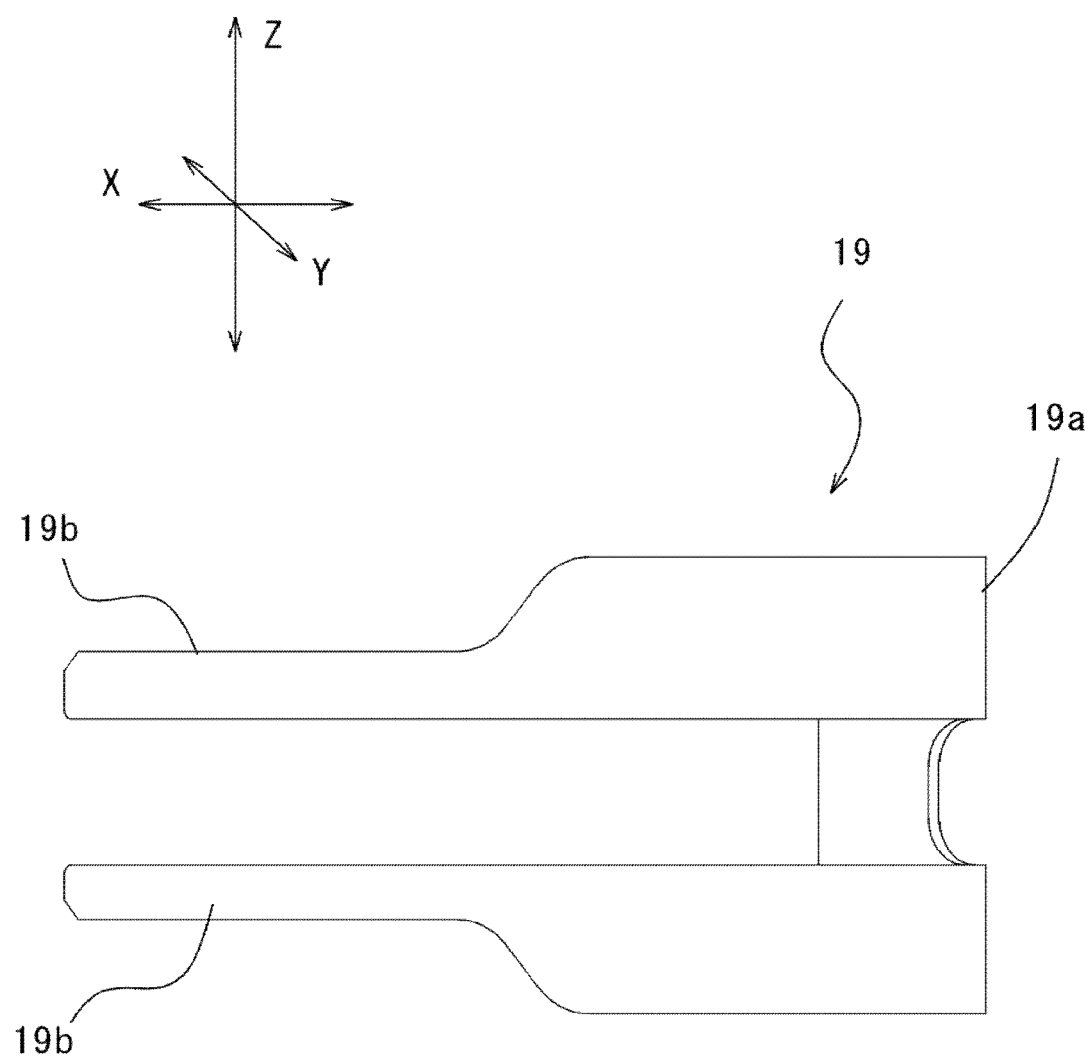
FIG. 24 is a perspective view of a lock member of the bumper system in FIG. 21.
Figure 25:
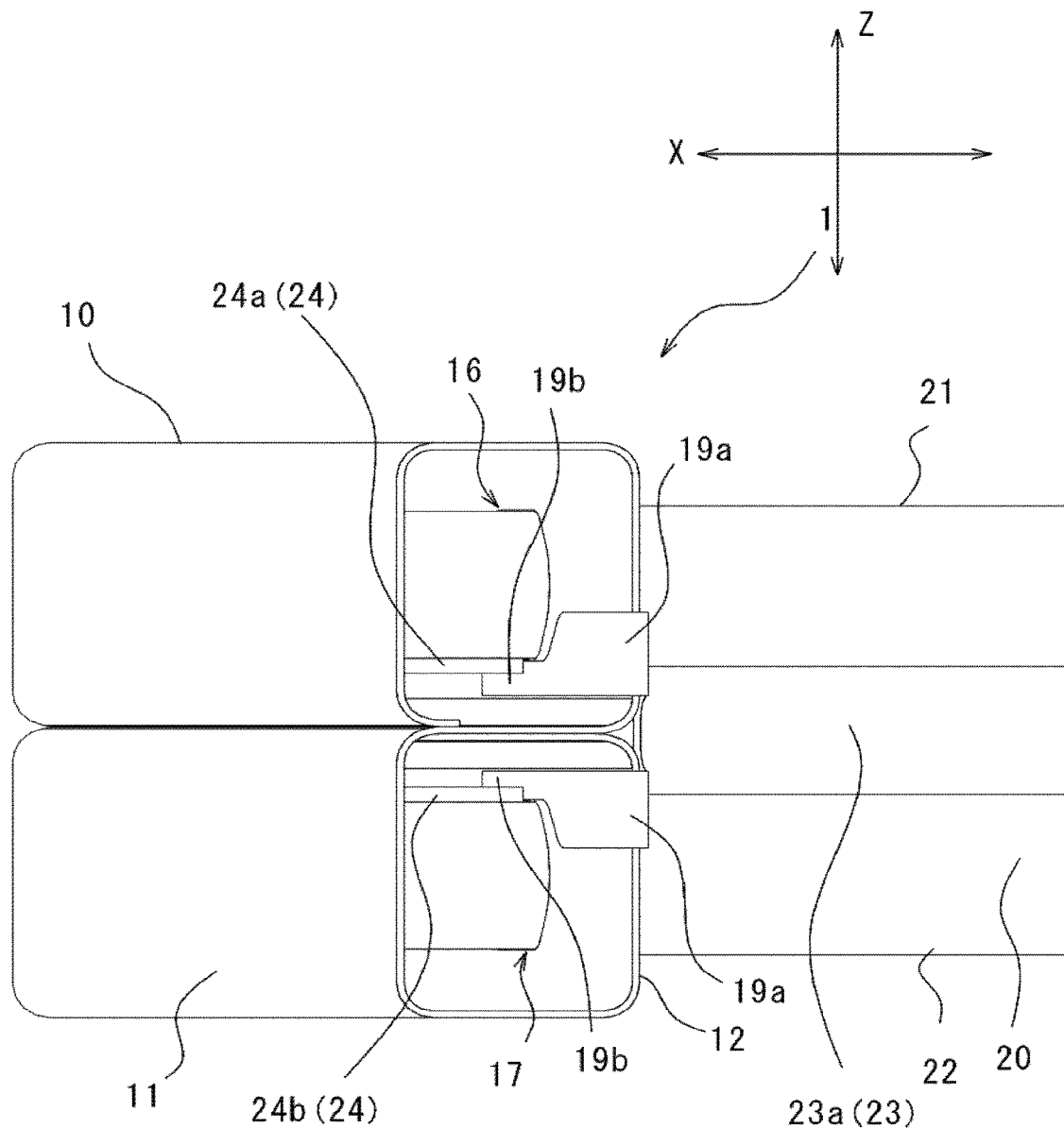
FIG. 25 is a side view near a joint portion of the bumper system in FIG. 21.

Referring to FIGS. 24 and 25, in the present embodiment, the bumper beam 10 includes a lock member 19. The lock member 19 includes a hook-shaped attachment portion 19a and an extension portion 19b extending from the attachment portion 19a in a bifurcated manner. The attachment portion 19a is attached to the rear wall 12. In a state where the attachment portion 19a is attached to the rear wall 12, the extension portion 19b is disposed across the partition wall 15. At this time, the guide grooves 16c and 17c are closed by the extension portion 19b. That is, the extension portion 19b is disposed between the pulling-out obstructing portion 24 and the guide grooves 16c and 17c in the vehicle front-rear direction. The pulling-out obstructing portion 24 abuts on the lock member 19 in a direction in which the bumper stay 20 is pulled out from the hole portions 16 and 17. In other words, the pulling-out obstructing portion 24 is configured to be caught by the lock member 19 when a force is applied in a direction in which the bumper stay 20 is pulled out from the hole portions 16 and 17.

Next, a method for joining members for the bumper system 1 having the above configuration will be described with reference to FIGS. 25 to 28.

Figure 26:
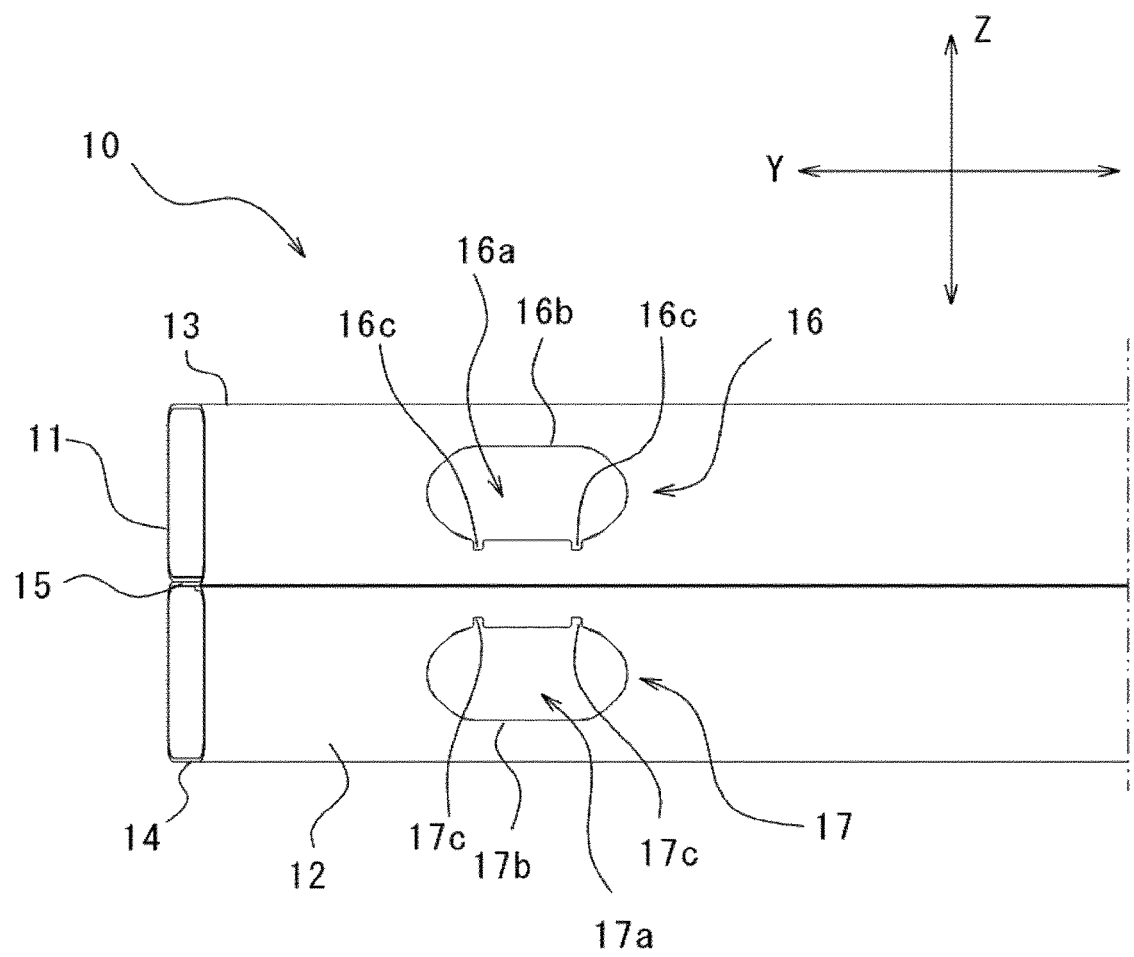
FIG. 26 is a front view showing a hole portion of the bumper beam in FIG. 22.
Figure 27:
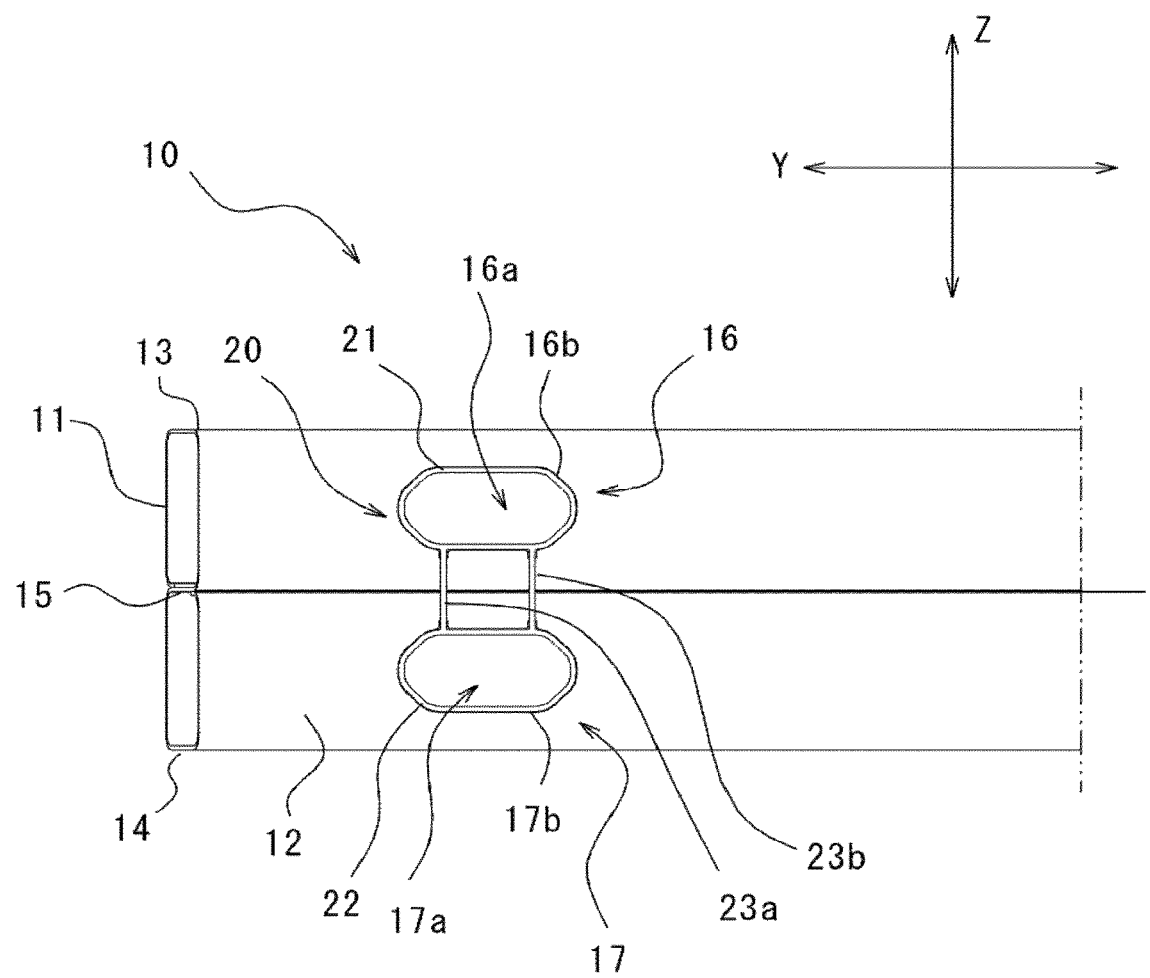
FIG. 27 is a front view in which the bumper stay is inserted into the hole portion of the bumper beam in FIG. 26.
Figure 28:
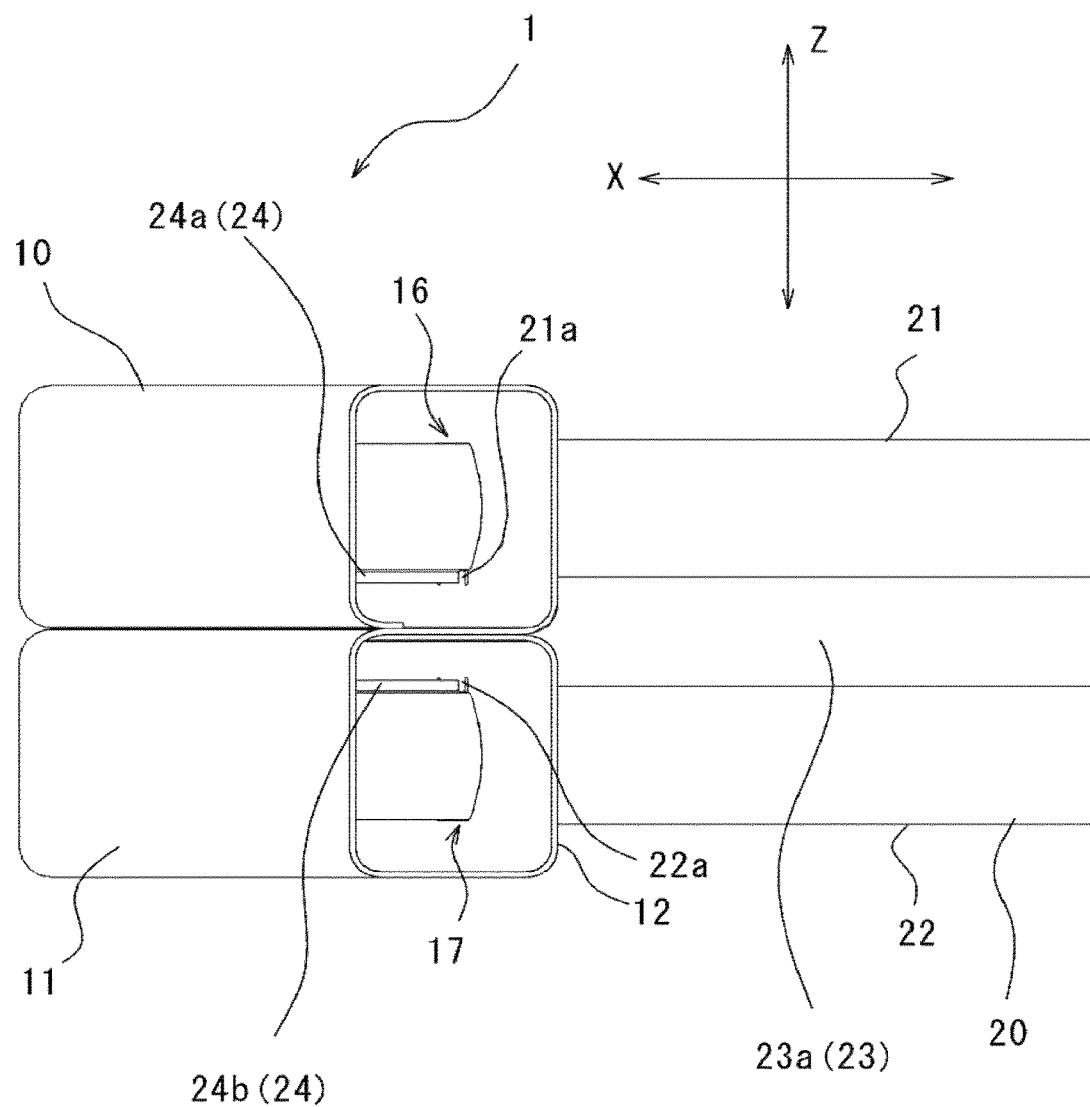
FIG. 28 is a side view in which the bumper stay is inserted into the hole portion of the bumper beam in FIG. 27.

With reference to FIGS. 26 to 28, the tubular portions 21 and 22 of the bumper stay 20 are respectively inserted into the hole portions 16 and 17 of the rear wall 12 of the bumper beam 10. The bumper stay 20 is pushed in until the front end abuts on the front wall 11 of the bumper beam 10. In a state where the front end of the bumper stay 20 abuts on the front wall 11 of the bumper beam 10, the positions in the vehicle front-rear direction of the recessed portions 21a and 22a and the rear wall 12 are aligned (see FIG. 28).

Each of the two hole portions 16 and 17 has a shape into which a corresponding one of the two tubular portions 21 and 22 in the pipe non-expanded state, and the pulling-out obstructing portion 24 can be inserted. In the inserted state, no gap is generated between the tubular portions 21 and 22 and the hole edges 16b and 17b.

Referring to FIGS. 25 and 28, the lock member 19 is attached to the end portion of the rear wall 12 as in the state in FIG. 25 from the state in FIG. 28. When the lock member 19 is attached, the guide grooves 16c and 17c are closed. Therefore, even when a force is applied in a direction in which the bumper stay 20 is pulled out from the hole portions 16 and 17, the pulling-out obstructing portion 24 is caught by the lock member 19.

Although not shown in detail, after the lock member 19 is attached as shown in FIG. 25, a columnar rubber member (elastic body) is inserted into each of the tubular portions 21 and 22, and the rubber member is disposed so as to straddle the rear wall 12 in the vehicle front-rear direction. Thereafter, by compressing the rubber member in the vehicle front-rear direction, the rubber member is bulged in a direction perpendicular to the vehicle front-rear direction, and each of the tubular portions 21 and 22 is expanded by pipe expansion. By this pipe expansion, the tubular portions 21 and 22 are respectively pressure-welded (pipe expansion joined) to the hole portions 16 and 17. That is, the bumper stay 20 is joined to the hole portions 16 and 17 of the bumper beam 10 by rubber bulge joining.

In this way, the bumper system 1 of the present embodiment is manufactured.

The action and effect of the bumper system 1 of the present embodiment are substantially the same as those of the first embodiment.

In addition, in the present embodiment, the lock member 19 can easily configure the catching structure of the pulling-out obstructing portion 24.

As described above, although the specific embodiments of the present invention are described, the present invention is not limited to the above-described embodiments, and can be implemented with various modifications within the scope of the present invention. For example, an appropriate combination of contents of the individual embodiments may be one embodiment of the present invention.

In addition, the shape of the bumper stay 20 is not limited to that of the above embodiments, and for example, the number of tubular portions may be one. The shape of the bumper beam 10 is also not limited to that of the above embodiments, and for example, the partition wall 15 does not need to be provided, and the shape of the cross section perpendicular to the vehicle width direction may be any polygon. The shape of the collar member 18 is also not limited to that of the above embodiments, and may be any shape that can fill the gaps between the hole edges 16b and 17b and the tubular portions 21 and 22. The shape of the lock member 19 is also not limited to that of the above embodiments, and may be any shape capable of partially closing the hole portions 16 and 17 so as to configure catching of the pulling-out obstructing portion 24.

In addition, an object to which the present invention is applied is not limited to the bumper system 1 of the above embodiments, and may be any joined body in which a tube body is joined by pipe expansion joining to a wall surface body having a hole portion, and a method for joining members therefor. The mode of pipe expansion joining in the method for joining members is also not limited to the rubber bulge joining, and any other pipe expansion joining such as mold bulge or electromagnetic forming can be adopted.

The invention claimed is:

1. A joined body comprising:
   a wall surface body provided with a hole portion; and
   a tube body including a tubular portion extending in a longitudinal direction, the tubular portion being inserted into the hole portion and joined to the hole portion by pipe expansion joining,
   wherein the tube body includes a pulling-out obstructing portion protruding from an outer surface of the tubular portion in a cross section perpendicular to the longitudinal direction, and
   the pulling-out obstructing portion abuts on the wall surface body in a direction in which the tube body is pulled out from the hole portion.

2. The joined body according to claim 1, wherein the hole portion has a shape into which the tubular portion in a pipe non-expanded state and the pulling-out obstructing portion are configured to be inserted.

3. The joined body according to claim 1, wherein the wall surface body includes a collar member disposed to fill a gap between a hole edge of the hole portion and the outer surface of the tubular portion.

4. The joined body according to claim 1, wherein the wall surface body includes a lock member disposed to partially close the hole portion, the lock member configured to abut on the pulling-out obstructing portion in a direction in which the tube body is pulled out from the hole portion.

5. The joined body according to claim 1, wherein
   the tube body includes a pushing-in obstructing portion protruding from the outer surface of the tubular portion in a cross section perpendicular to the longitudinal direction, and
   the pushing-in obstructing portion abuts on the wall surface body in a direction in which the tube body is pushed into the hole portion.

6. The joined body according to claim 5, wherein
   the tube body includes two of the tubular portions, and
   the pushing-in obstructing portion connects the two tubular portions.

7. The joined body according to claim 1, wherein a material of the wall surface body is different from a material of the tube body.

8. The joined body according to claim 2, wherein the wall surface body includes a collar member disposed to fill a gap between a hole edge of the hole portion and the outer surface of the tubular portion.

9. The joined body according to claim 2, wherein the wall surface body includes a lock member disposed to partially close the hole portion, the lock member configured to abut on the pulling-out obstructing portion in a direction in which the tube body is pulled out from the hole portion.

10. The joined body according to claim 2, wherein
the tube body includes a pushing-in obstructing portion protruding from the outer surface of the tubular portion in a cross section perpendicular to the longitudinal direction, and
the pushing-in obstructing portion abuts on the wall surface body in a direction in which the tube body is pushed into the hole portion.

11. The joined body according to claim 10, wherein
the tube body includes two of the tubular portions, and
the pushing-in obstructing portion connects the two tubular portions.

12. The joined body according to claim 2, wherein a material of the wall surface body is different from a material of the tube body.

\* \* \* \* \*